United States Patent
Matsuo et al.

(10) Patent No.: US 6,699,830 B1
(45) Date of Patent: Mar. 2, 2004

(54) CROSSLINKED COPOLYMER OF UNSATURATED CARBOXYLIC ACID AND PROCESS FOR PRODUCING THE SAME, COPOLYMER OF UNSATURATED CARBOXYLIC ACID, BIODEGRADEABLE BUILDER, AND DETERGENT COMPOSITION

(75) Inventors: Shigeru Matsuo, Yamaguchi (JP); Yoshikatsu Seino, Yamaguchi (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/700,727

(22) PCT Filed: Mar. 23, 2000

(86) PCT No.: PCT/JP00/01781

§ 371 (c)(1),
(2), (4) Date: Dec. 20, 2000

(87) PCT Pub. No.: WO00/59958

PCT Pub. Date: Oct. 12, 2000

(30) Foreign Application Priority Data

| Mar. 30, 1999 | (JP) | ............................................. 11-87919 |
| Mar. 30, 1999 | (JP) | ............................................. 11-88061 |
| Sep. 17, 1999 | (JP) | ........................................ 11-263536 |
| Jan. 20, 2000 | (JP) | ........................................ 2000-11671 |

(51) Int. Cl.⁷ .......................... C08F 8/00; C08F 20/06; C08F 265/00; C11D 3/37
(52) U.S. Cl. ....................... 510/475; 510/361; 510/434; 510/476; 510/477; 510/533; 525/10; 525/43; 525/329.7; 528/192; 528/205; 528/219
(58) Field of Search ................................ 510/361, 434, 510/475, 476, 477, 533; 525/10, 43, 329.7; 528/192, 205, 219

(56) References Cited

U.S. PATENT DOCUMENTS

| 5,191,048 A | 3/1993 | Swift et al. ................. 526/271 |
| 5,298,570 A | 3/1994 | Tahara et al. ............. 525/329.7 |
| 6,310,030 B1 * | 10/2001 | Matsuo et al. ............... 510/476 |
| 6,344,434 B1 * | 2/2002 | Matsuo et al. ............... 510/476 |

FOREIGN PATENT DOCUMENTS

| EP | 0 429 307 | 5/1991 | |
| JP | WO 97/38029 | * 10/1997 | ........... C08F/20/04 |
| JP | 10-195137 | 7/1998 | |
| JP | 10-204119 | 8/1998 | |

OTHER PUBLICATIONS

U.S. patent application Ser. No. 09/622,917, filed Sep. 7, 2000, pending.

U.S. patent application Ser. No. 09/091,841, filed Jul. 23, 1999, pending.

U.S. patent application Ser. No. 09/104,003, Jun. 24, 1998, abandoned.

U.S. patent application Ser. No. 09/700,727, Nov. 30, 2000, pending.

* cited by examiner

*Primary Examiner*—Brian P. Mruk
(74) *Attorney, Agent, or Firm*—Oblon, Spivak, McClelland, Maier & Neustadt, P.C.

(57) ABSTRACT

The invention relates to a crosslinked, carboxylic acid-based copolymer having good water absorbability and biodegradability, and a method for producing it; to an unsaturated carboxylic acid polymer having good detergency and its use; and to a biodegradable builder, a detergent composition and a dispersant. The invention includes (1) a crosslinked product of a copolymer from a monomer component that comprises an unsaturated monocarboxylic acid monomer and a specific amount of a quinone; and (2) an unsaturated carboxylic acid polymer which gives specific peaks in proton nuclear magnetic resonance spectrometry, and which has a specific number-average molecular weight and has calcium ion-sequestering ability, or an unsaturated carboxylic acid polymer having a specific structure.

24 Claims, 9 Drawing Sheets

CROSSLINKED COPOLYMER OF UNSATURATED CARBOXYLIC ACID AND PROCESS FOR PRODUCING THE SAME, COPOLYMER OF UNSATURATED CARBOXYLIC ACID, BIODEGRADEABLE BUILDER, AND DETERGENT COMPOSITION

TECHNICAL FIELD

The present invention relates to a crosslinked product of an unsaturated carboxylic acid-based copolymer, precisely to a crosslinked product of an unsaturated carboxylic acid-based copolymer having good water absorbability and biodegradability, and to a method for producing it. The invention also relates to a novel unsaturated carboxylic acid polymer, precisely to an unsaturated carboxylic acid polymer having good properties of high detergency and biodegradability, and to its use, as well as to a biodegradable builder, a detergent composition and a dispersant containing the polymer as the constituent ingredient.

BACKGROUND ART

Absorbent resin can absorb water of tens to thousands times the self-weight of the resin, and is widely used in various fields of sanitary napkins, cut-off materials, soil improvers, water-holding materials, oil-water separators, dirty water absorbents, etc. After used, absorbent resin is disposed of in soil or is incinerated. However, thus discarding the used absorbent resin is problematic in that it still remains in soil without being degraded therein and in that, after incinerated, it is strongly alkaline to cause damage to incinerators. To solve the problems, various biodegradable absorbent resins have been proposed, and starch-based resins, hyaluronic acid-based resins, polyaspartic acid-based crosslinked products and polyglutamic acid-based crosslinked products are known of those, polyglutamic acid-based crosslinked products have especially excellent biodegradability (for example, Japanese Patent Laid-Open Nos. 322358/1994, 300563/1995, 251402/1998). However, their production methods are all complicated and are not efficient.

The first aspect of the present invention has been made from the viewpoint as above, and its object is to provide a crosslinked product of a carboxylic acid-based copolymer having good water absorbability and biodegradability and to provide an efficient method for producing it.

Conventional detergent comprising surfactant as an essential ingredient contains a builder as an auxiliary component to the surfactant to thereby improve its detergency. As the builder, known are inorganic compounds which are alkaline in water, and polymers of unsaturated aliphatic carboxylic acids, etc. As examples of the former, mentioned are sodium and potassium carbonates, hydrogencarbonates, phosphates, polyphosphates and silicates, as well as zeolite, etc.; while examples of the latter include polyacrylic acid, polymaleic acid, polyitaconic acid, etc.

Of those builders, much used are phosphates, polyphosphates and zeolite, as they are effective in detergent, economical and easy to handle. However, these are problematic from the viewpoint of the protection of the global environment in that phosphates and polyphosphates eutrophicate lakes, marshes and rivers while zeolite precipitates in rivers, etc.

Accordingly, it is desired to develop some other builders, of which the capability, especially, the chelating ability (calcium ion-sequestering ability) is good like that of conventional builders, which are well biodegradable to be gentle to the environment, without remaining for a long period of time on the earth, and are therefore not problematic from the viewpoint of the protection of the global environment, and which are economical.

To meet the requirements, Japanese Patent Laid-Open No. 239127/1993 discloses chelatable and biodegradable, crosslinked polymers suitable for builders. To prepare the polymers, water-soluble oligomers, which contain biodegradable low-molecular-weight components, are crosslinked at their main chains with a crosslinking agent, such as polyethylene glycol, citric acid, tartaric acid or the like, via a biodegradable ester or amido group to thereby increase their molecular weight. However, though having a low molecular weight thereby to have increased biodegradability, the linear polyacrylic acid moiety in those crosslinked polymers is hardly biodegradable, and, in addition, the polymers contain hardly-biodegradable high-molecular-weight linear polyacrylic acids to no small extent. Therefore, the biodegradability of the crosslinked polymers disclosed is not satisfactory. Another problem with the polymers is that the method for producing them is not simple, as requiring two steps, one for polymerizing the oligomer and the other for crosslinking the polymerized oligomer, and requiring the special crosslinking agent.

Japanese Patent Laid-Open No. 80377/1975 discloses acrylic acid or acrolein polymers and their modified derivatives or copolymers usable as builders. However, these are all problematic in that their chelatability and biodegradability are not satisfactory.

Accordingly, it is desired to develop polymers having good chelatability and good biodegradability and therefore suitable to builders and to develop methods for efficiently producing them.

In the field of dispersants for inorganic pigments, sodium polyacrylate or the like is used for lowering the viscosity of slurry dispersions and for improving the viscosity stability thereof. However, polyacrylic acid is not biodegradable. Also in this field, therefore, it is desired to develop some other dispersants which are biodegradable without remaining on the earth for a long period of time and which are economical.

The second to fourth aspects of the invention are to provide an unsaturated carboxylic acid polymer having good chelatability and good biodegradability and therefore suitable to builders, and to provide a builder for detergent, a detergent composition and a dispersant containing the polymer.

DISCLOSURE OF THE INVENTION

We, the present inventors have assiduously studied, and, as a result, have found out a crosslinked product of a specific unsaturated carboxylic acid-based copolymer which is derived from a monomer component that comprises an unsaturated monocarboxylic acid monomer and a quinone. On the basis of this finding, we have completed the first aspect of the invention.

Specifically, the first aspect of the invention is summarized as follows:

(1) A crosslinked product of an unsaturated carboxylic acid-based copolymer derived from a monomer component that comprises an unsaturated monocarboxylic acid monomer and a quinone, of which the copolymer contains from 1 to 10 mol % of the quinone.

(2) The crosslinked product of an unsaturated carboxylic acid-based copolymer of above (1), for which the unsaturated monocarboxylic monomer is an acrylic or methacrylic acid, or its salt.

(3) The crosslinked product of an unsaturated carboxylic acid-based copolymer of above (1) or (2), for which the quinone is at least one selected from hydroquinone, resorcinol, catechol, naphthalenediol, anthraquinol, benzoquinone, naphthoquinone, anthraquinone, and their substituted derivatives.

(4) The crosslinked product of an unsaturated carboxylic acid-based copolymer of any of above (1) to (3), which is a biodegradable absorbent resin.

(5) A method for producing the crosslinked product of an unsaturated carboxylic acid-based copolymer of any of above (1) to (4), which comprises heating an unsaturated monocarboxylic acid monomer, a quinone and a crosslinking agent in an aqueous solvent in the presence of an initiator, and in which the quinone accounts for from 1 to 10 mol % of the overall amount of the monomer component.

(6) The method of above (5) for producing the crosslinked product of an unsaturated carboxylic acid-based copolymer, wherein the crosslinking agent is a water-soluble compound having, in one molecule, at least two hydroxyl groups, amino groups or unsaturated groups capable of reacting with a carboxyl group.

We, the present inventors have further found that an unsaturated carboxylic acid polymer having a specific chemical structure is soluble in water, well chelatable and biodegradable, and that the polymer is highly useful for builders, detergent compositions and dispersants. On the basis of these findings, we have completed the second to fourth aspects of the present invention.

Specifically, the second aspect of the invention is summarized as follows:

[1] An unsaturated carboxylic acid polymer, (a) which gives, in proton nuclear magnetic resonance spectrometry, absorption peaks at least at δ of from 6.4 to 7.5 ppm and at δ of from 1.0 to 3.2 ppm, and gives a ratio of the integrated value of the peak area at δ of from 6.4 to 7.5 ppm to that of the peak area at δ of from 1.0 to 3.2 ppm of falling between $2.2 \times 10^{-3}$ and 0.3, (b) which has a number-average molecular weight of from 500 to 1,000,000, (c) which is soluble in water, and (d) which has a degree of calcium ion-sequestering ability of at least 150 mg $CaCO_3$/g.

[2] A biodegradable builder containing, as the constituent ingredient, the unsaturated carboxylic acid polymer of above [1].

[3] A detergent composition containing, as the constituent ingredients, the unsaturated carboxylic acid polymer of above [1] and a surfactant.

[4] A dispersant which comprises a polymer prepared by neutralizing the unsaturated carboxylic acid polymer of above [1] with an alkali.

The third aspect of the invention is summarized as follows:

[1] An unsaturated carboxylic acid polymer, which comprises;

(A) from 30 to 99 mol % of repetitive units (a) of a general formula [III-1]:

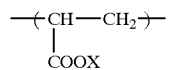

[III-1]

wherein X represents a hydrogen atom, an alkali metal atom or an ammonium group, (B) from 0 to 69.9 mol % of repetitive units (b) of a general formula [III-2]:

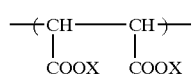

[III-2]

wherein X represents a hydrogen atom, an alkali metal atom or an ammonium group, and (C) from 0.1 to 50 mol % of structural units that are the total of repetitive units (c) of a general formula [III-3]:

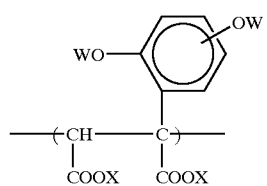

[III-3]

wherein X represents a hydrogen atom, an alkali metal atom or an ammonium group, and W represents a hydrogen atom or an alkali metal atom, repetitive units (d) of a general formula [III-4]:

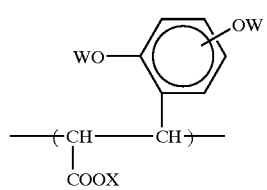

[III-4]

wherein X represents a hydrogen atom, an alkali metal atom or an ammonium group, and W represents a hydrogen atom or an alkali metal atom, and repetitive units (e) of a general formula [III-5]:

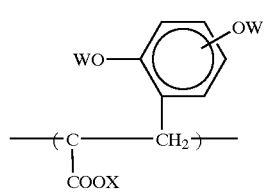

[III-5]

wherein X represents a hydrogen atom, an alkali metal atom or an ammonium group, and W represents a hydrogen atom or an alkali metal atom, and which has a number-average molecular weight of from 500 to 1,000,000.

[2] An unsaturated carboxylic acid polymer, which comprises;

(A) from 30 to 99 mol % of repetitive units (a) of a general formula [III-1]:

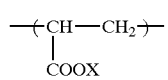

[III-1]

wherein X represents a hydrogen atom, an alkali metal atom or an ammonium group, (B) from 0 to 69.9 mol % of repetitive units (b) of a general formula [III-2]:

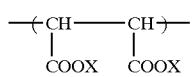
[III-2]

wherein X represents a hydrogen atom, an alkali metal atom or an ammonium group, and (C) from 0.1 to 50 mol % of structural units that are the total of repetitive units (c') of a general formula [III-3']:

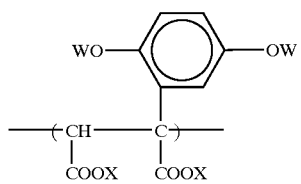
[III-3']

wherein X represents a hydrogen atom, an alkali metal atom or an ammonium group, and W represents a hydrogen atom or an alkali metal atom, repetitive units (d') of a general formula [III-4']:

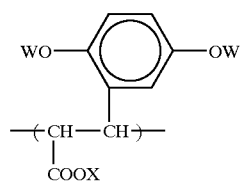
[III-4']

wherein X represents a hydrogen atom, an alkali metal atom or an ammonium group, and W represents a hydrogen atom or an alkali metal atom, and repetitive units (e') of a general formula [III-5']:

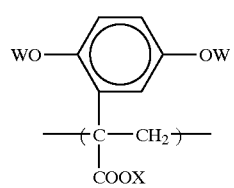
[III-5']

wherein X represents a hydrogen atom, an alkali metal atom or an ammonium group, and W represents a hydrogen atom or an alkali metal atom, and which has a number-average molecular weight of from 500 to 1,000,000.

[3] A biodegradable builder containing, as the constituent ingredient, the unsaturated carboxylic acid polymer of above [1] or [2].

[4] A detergent composition containing, as the constituent ingredients, the unsaturated carboxylic acid polymer of above [1] or [2] and a surfactant.

[5] A dispersant which comprises a polymer prepared by neutralizing the unsaturated carboxylic acid polymer of above [1] or [2] with an alkali.

The fourth aspect of the invention is summarized as follows:

[1] An unsaturated carboxylic acid polymer, which comprises;

(A) repetitive units (a) of a formula [IV-1]:

[IV-1], (B) repetitive units (b) of a general formula [IV-2]:

[IV-2]

wherein $R^1$ represents a hydrogen atom or a methyl group; X represents a hydrogen atom, an alkali metal atom or an ammonium group, and (C) repetitive units (c) of a general formula [IV-3]:

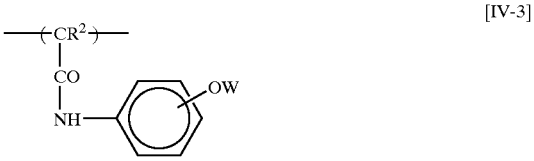
[IV-3]

wherein $R^2$ represents a hydrogen atom or a methyl group; W represents a hydrogen atom or an alkali metal atom, with the structural units of the repetitive units (c) accounting for from 0.25 to 50 mol % of all the structural units of the polymer, and which has a number-average molecular weight of from 500 to 1,000,000.

[2] An unsaturated carboxylic acid polymer, which comprises;

(A) repetitive units (a) of a formula [IV-1]:

[IV-1], (B) repetitive units (b) of a general formula [IV-2]:

[IV-2]

wherein $R^1$ represents a hydrogen atom or a methyl group; X represents a hydrogen atom, an alkali metal atom or an ammonium group, and (C) repetitive units (c') of a general formula [IV-3']:

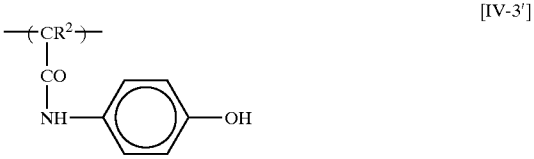
[IV-3']

wherein $R^2$ represents a hydrogen atom or a methyl group, with the structural units of the repetitive units (c') accounting for from 0.25 to 50 mol % of all the structural units of the polymer, and which has a number-average molecular weight of from 500 to 1,000,000.

[3] A method for producing the unsaturated carboxylic acid polymer of above [1], which comprises copolymerizing one or more of unsaturated carboxylic acids or their salts of a general formula [IV-4]:

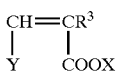

[IV-4]

wherein R³ represents a hydrogen atom or a methyl group; X represents a hydrogen atom, an alkali metal atom or an ammonium group; and Y represents a hydrogen atom or a group of COOX, with an unsaturated compound of a general formula [IV-5]:

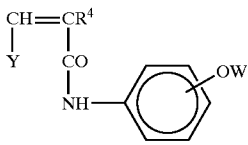

[IV-5]

wherein R⁴ represents a hydrogen atom or a methyl group; Y represents a hydrogen atom or a group of COOX (in which X represents a hydrogen atom, an alkali metal atom or an ammonium group); and W represents a hydrogen atom or an alkali metal atom, in the presence of a polymerization initiator.

[4] A method for producing the unsaturated carboxylic acid polymer of above [2], which comprises copolymerizing one or more of unsaturated carboxylic acids or their salts of a general formula [IV-4]:

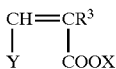

[IV-4]

wherein R³ represents a hydrogen atom or a methyl group; X represents a hydrogen atom, an alkali metal atom or an ammonium group; and Y represents a hydrogen atom or a group of COOX, with an unsaturated compound of a general formula [IV-5']:

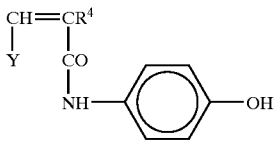

[IV-5']

wherein R⁴ represents a hydrogen atom or a methyl group; Y represents a hydrogen atom or a group of COOX (in which X represents a hydrogen atom, an alkali metal atom or an ammonium group), in the presence of a polymerization initiator.

[5] A biodegradable builder containing, as the constituent ingredient, the unsaturated carboxylic acid polymer of above [1] or [2].

[6] A detergent composition containing, as the constituent ingredients, the unsaturated carboxylic acid polymer of above [1] or [2] and a surfactant.

[7] A dispersant which comprises a polymer prepared by neutralizing the unsaturated carboxylic acid polymer of above [1] or [2] with an alkali.

BEST MODES OF CARRYING OUT THE INVENTION

Figure 1:
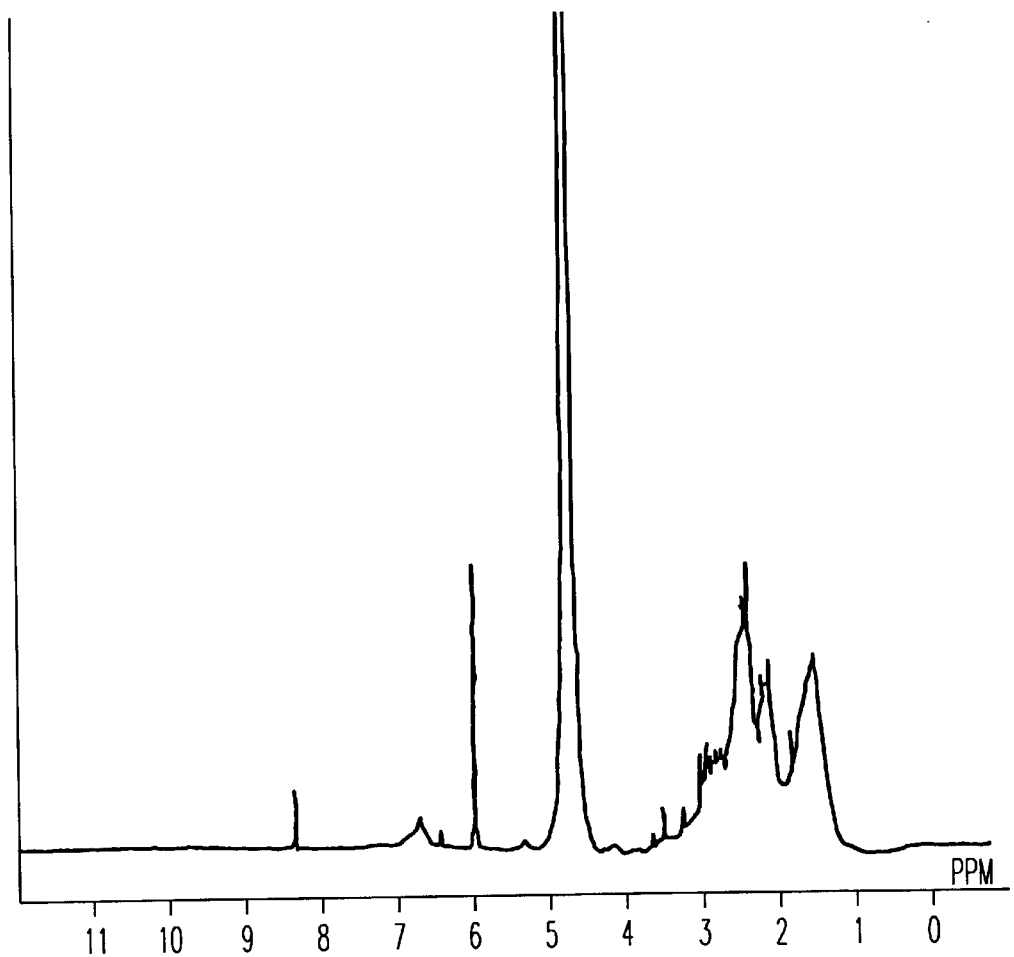
FIGS. 1–4 are the ¹H-NMR spectral charts of the unsaturated carboxylic acid polymers obtained in Example II-1 to Example II-4, respectively.
Figure 2:
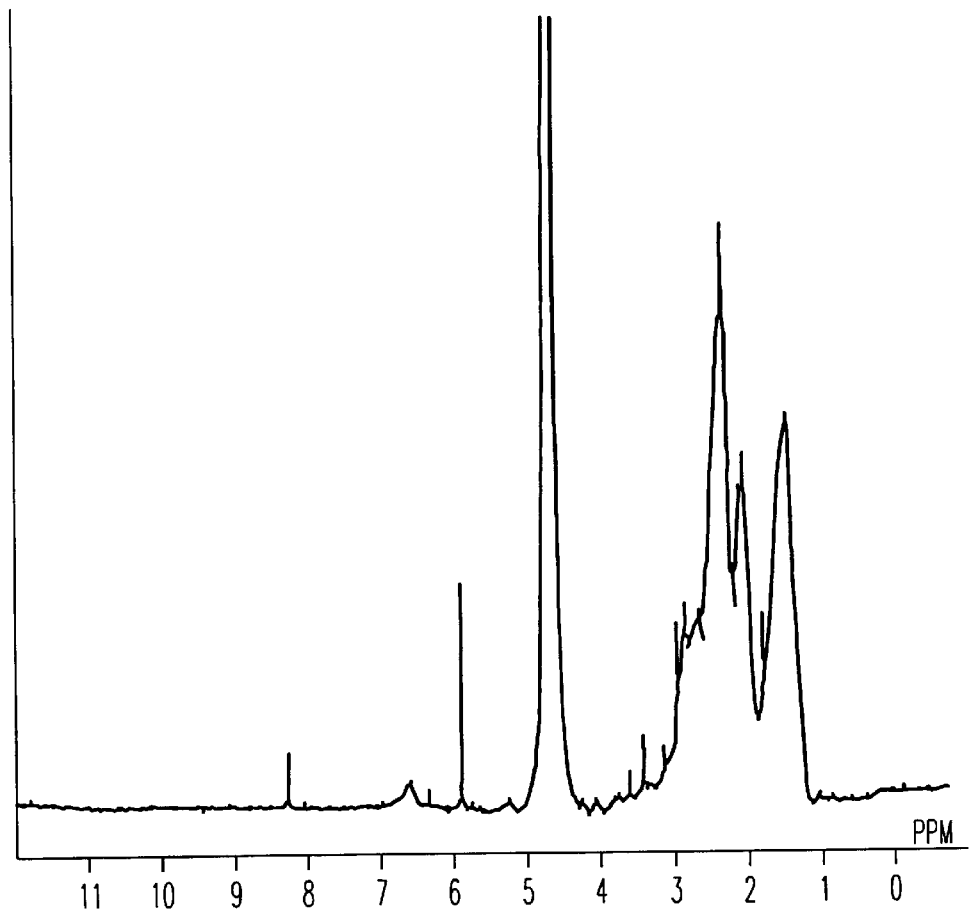
Figure 3:
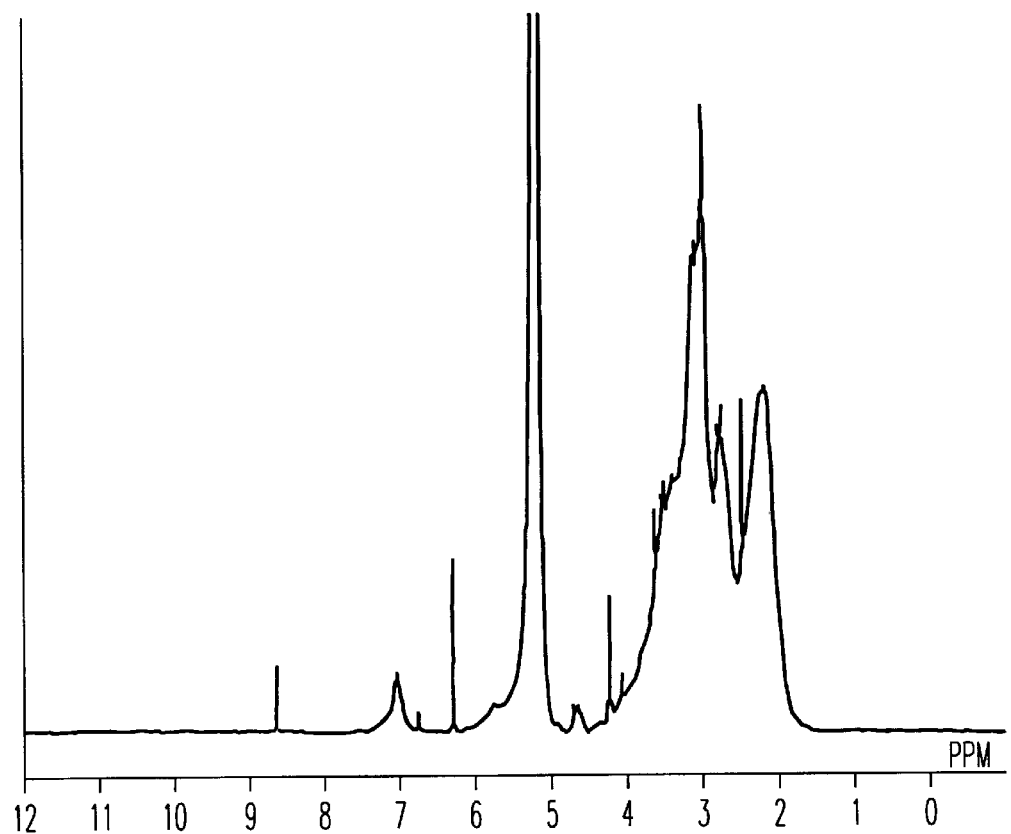
Figure 4:
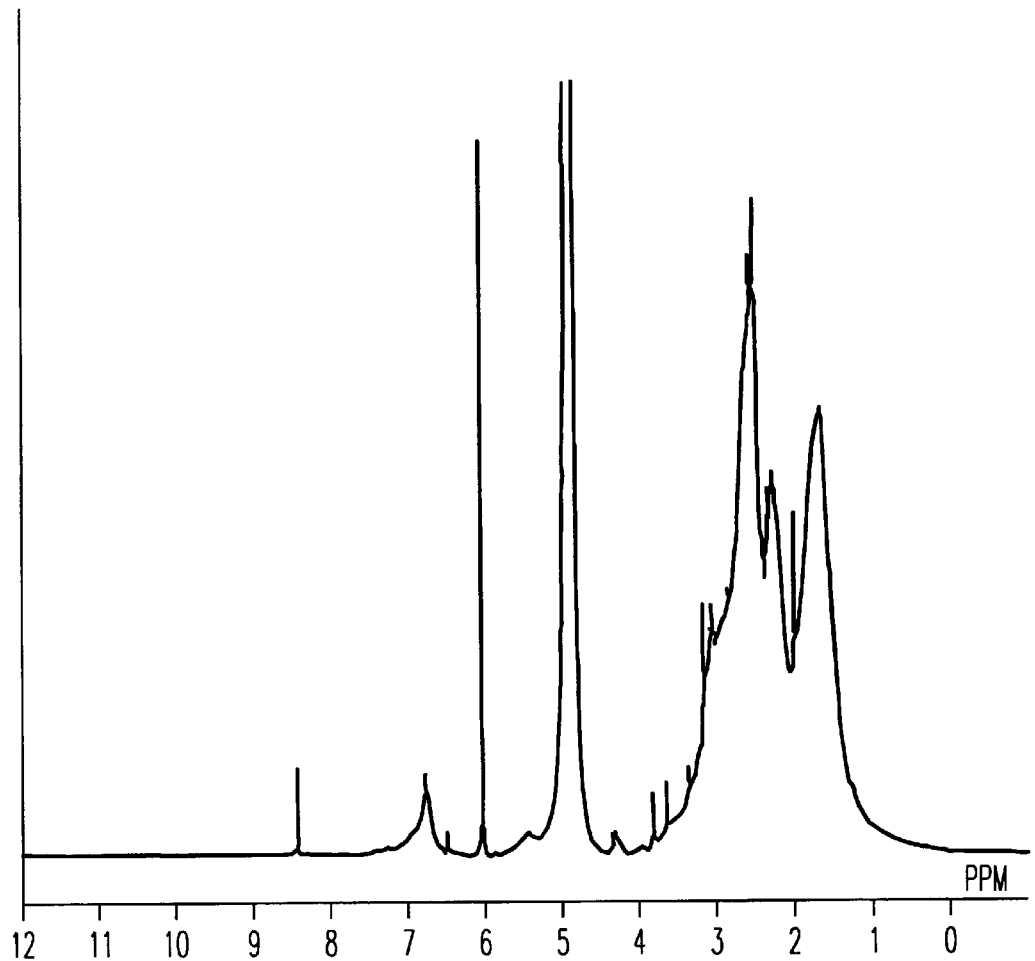

The invention is described in detail hereinunder.

First Aspect of the Invention

In this section, the first aspect of the invention will be simply referred to as "the invention".

As so mentioned hereinabove, the crosslinked product of an unsaturated carboxylic acid-based copolymer of the invention is derived from a monomer component that comprises an unsaturated monocarboxylic acid monomer and a quinone, of which the copolymer contains from 1 to 10 mol %, preferably from 2 to 7 mol % of the quinone. If the quinone content of the copolymer is too small, the biodegradability of the crosslinked copolymer will be poor; but if too large, the water absorbability thereof will be poor.

The method for producing the crosslinked product of an unsaturated carboxylic acid-based copolymer is described below.

For producing the crosslinked product of a polycarboxylic acid polymer, an unsaturated monocarboxylic acid monomer, a quinone and a crosslinking agent are heated in the presence of an initiator, for which the quinone accounts for from 1 to 10 mol % (preferably from 2 to 7 mol %) of the overall amount of the monomer component. Concretely, a quinone and a crosslinking agent are mixed in an aqueous solution of an unsaturated monocarboxylic acid monomer, then an initiator is added thereto and heated with stirring to thereby polymerize the monomers, and thereafter the reaction system is heated at 100° C. or higher to thereby crosslink and dehydrate the copolymer.

The unsaturated monocarboxylic acid monomer includes acrylic acid, methacrylic acid or their salts, that is, partially or completely neutralized products of the acids with any of monovalent metals, divalent metals, ammonia or organic amines, or their mixtures. The monovalent metals include Na and K; and the divalent metals include Mg, Ca, Ba and Zn. The organic amines include alkylamines such as monomethylamine, dimethylamine, trimethylamine, monoethylamine, diethylamine, triethylamine, etc.; alkanolamines such as monoethanolamine, diethanolamine, triethanolamine, monoisopropanolamine, dimethylethanolamine, etc.; pyridines, etc. Of those, preferred are acrylic acid and salts of acrylic acid.

The other monomer, quinone is at least one selected from hydroquinone, resorcinol, catechol, naphthalenediol, anthraquinol, benzoquinone, naphthoquinone, anthraquinone, and their substituted derivatives. The substituent to form the derivatives includes an alkyl group, a sulfonic acid group, a halogen atom, a hydroxyl group, a carboxyl group, etc. Of those quinones, preferred are hydroquinone and p-benzoquinone.

Regarding the ratio of the two monomers to be fed into a reactor, the unsaturated monocarboxylic acid monomer accounts for from 90 to 99 mol % (preferably from 93 to 98 mol %) of the overall amount of the monomers, and the quinone for from 1 to 10 mol % (preferably from 2 to 7 mol %) thereof. The reaction of the monomers is effected in an aqueous solvent. In this case, the amount of all the monomers to be reacted is from 1 to 16 mols in one liter of water.

The crosslinking agent is a water-soluble compound having, in one molecule, at least two hydroxyl groups, amino groups or unsaturated groups capable of reacting with a carboxyl group. Concretely, the compounds having hydroxyl groups are ethylene glycol, diethylene glycol, triethylene glycol, polyethylene glycol, glycerin, polyglycerin, propylene glycol, diethanolamine, triethanolamine, polyoxypropylene, polyvinyl alcohol, pentaerythritol, sorbitol, sorbitan, glucose, mannitol, mannitan, etc. The compounds having amino groups are ethylenediamine, propylenediamine, etc. The compounds having unsaturated groups are ethylene glycol diacrylate, propylene glycol diacrylate, N,N-methylenebisacrylamide, etc. The amount of the crosslinking agent to be in the reaction system preferably falls between 0.0005 and 20 parts by weight relative to 100 parts by weight of all the monomers. Within the defined range, the copolymer crosslinked could be a resin capable of absorbing water to a satisfactory degree. On the contrary, however, if the amount of the crosslinking agent used is smaller than 0.0005 parts by weight, the crosslink density of the copolymer will be too small to ensure water retention in the copolymer having absorbed water.

In the invention, the monomers are polymerized and the copolymer gel will be cut into pieces. Preferably, a nonionic or anionic surfactant is added to the polymerization system in order to prevent the copolymer gel pieces from fusing together or from being sticky to each other. Concretely, the surfactant includes polyoxyethylene alkyl ethers, polyoxyethylene phenol ethers, sorbitan fatty acid esters, polyoxyethylene-sorbitan fatty acid esters, polyoxyethylene acyl esters, oxyethylene-oxypropylene block copolymers, sucrose fatty acid esters, salts of higher alcohol sulfates, salts of alkylbenzenesulfonates, polyoxyethylene sulfates, etc. The amount of the surfactant to be used may fall between 0.01 and 10 parts by weight relative to 100 parts by weight of all the monomers.

Not specifically defined, the initiator for the polymerization may be any ordinary water-soluble radical initiator. For example, it includes ammonium persulfate, potassium persulfate, hydrogen peroxide, etc. Also usable herein is a redox initiator, which is a combination of any of such compounds and a reducing agent such as sodium hydrogensulfite, L-ascorbic acid, ferrous salts, etc. The amount of the initiator may fall between 0.001 and 5 parts by weight relative to 100 parts by weight of all the monomers; and the amount of the reducing agent may fall between 0.00001 and 5 parts by weight relative to 100 parts by weight of all the monomers.

The polymerization may be effected at 40 to 120° C. for 1 to 20 hours. The crosslinking dehydration may be effected at 60 to 200° C. or at 100 to 200° C. for 1 to 10 hours.

After powdered, the crosslinked, carboxylic acid-based copolymer thus obtained in the invention serves principally as an absorbent resin.

The invention is described more concretely with reference to the following Examples, which, however, are not intended to restrict the scope of the invention.

EXAMPLE I-1

72.0 g of acrylic acid, 30.0 g of sodium hydroxide and 60.0 g of water were put into a 500 ml separable flask equipped with a stirrer, a thermocouple and a reflux condenser, and stirred at room temperature. Next, 5.5 g of hydroquinone, 500 mg of glycerin, and 15 mg of ferrous chloride tetrahydrate were added thereto and formed into a uniform solution. While this was heated in an oil bath at 80° C., 40.0 g of an aqueous solution containing 300 mg of hydrogen peroxide was dropwise added thereto over a period of 3 hours. After the addition, this was further heated for 1 hour at that temperature. After having been thus polymerized, a part of the resulting product was taken out into a stainless vat and cut into fine pieces therein with a cutter. These were crosslinked and dehydrated by drying at 180° C. for 90 minutes. The product thus obtained is a crosslinked, hydroquinone-containing alkali metal polyacrylate. The thus-obtained crosslinked product was powdered by the use of a shaking mill. 0.2 g of the powder was put into a small bag of non-woven fabric, leveled, and dipped in a 0.9 wt. % saline solution. After having been thus dipped in the solution for 3 minutes and 5 minutes, the bag was weighed. On the other hand, the bag alone not dipped in the solution was weighed, and this is the blank. The degree of swelling of the crosslinked product was obtained according to the following equation:

$$\text{Degree of swelling} = [\text{weight after absorption } (g) - \text{blank } (g)] / \text{weight of powder } (g).$$

In the same manner as above, a bag with the crosslinked copolymer powder therein was dipped in deionized water, and the degree of swelling of the powder was obtained. Next, the viscosity of a 1% dispersion of the crosslinked copolymer powder was measured by the use of a B-type viscometer (25° C., 12 rpm). The data obtained are given in Table I-1.

In the Table, "Example I-1" is simply referred to as "Example 1", and the same shall apply to Comparative Examples. The same simplified expression shall apply hereinunder.

EXAMPLE I-2

72.0 g of acrylic acid, 30.0 g of sodium hydroxide and 60.0 g of water were put into a 500 ml separable flask equipped with a stirrer, a thermocouple and a reflux condenser, and stirred at room temperature. Next, 5.5 g of hydroquinone, 500 mg of glycerin, 15 mg of ferrous chloride tetrahydrate, and 5.1 g of polyoxyethylene-sorbitan fatty acid ester serving as a surfactant were added thereto and formed into a uniform solution. While this was heated in an oil bath at 80° C., 40.0 g of an aqueous solution containing 300 mg of hydrogen peroxide was dropwise added thereto over a period of 3 hours. After the addition, this was further heated for 1 hour at that temperature. After having been thus polymerized, a part of the resulting product was taken out into a stainless vat and cut into fine pieces therein with a cutter. These were crosslinked and dehydrated by drying at 180° C. for 90 minutes. The product thus obtained is a crosslinked, hydroquinone-containing alkali metal polyacrylate. The thus-obtained crosslinked product was powdered by the use of a shaking mill. 0.2 g of the powder was put into a small bag of non-woven fabric, leveled, and dipped in a 0.9 wt. % saline solution. After having been thus dipped in the solution for 3 minutes and 5 minutes, the bag was weighed. The degree of swelling of the crosslinked product was obtained in the same manner as in Example I-1. In addition, the degree of swelling of the crosslinked product in deionized water was obtained also in the same manner. Next, the viscosity of a 1% dispersion of the crosslinked copolymer powder was measured by the use of a B-type viscometer (25° C., 12 rpm). The data obtained are given in Table I-1.

EXAMPLES I-3 to I-8

The crosslinking agent and the surfactant both indicated in Table I-1 were used to produce crosslinked copolymers in the manner as in Example I-1 and Example I-2. The data of the products are given in Table I-1.

EXAMPLES I-9 to I-12

The non-crosslinked non-dehydrated polymers of Examples I-1 to I-4 were separately formed into sheets having a thickness of 5 mm, and dried at 180° C. for 30 minutes. These sheets were put into an aqueous solution of 1,000 wt.ppm of activated sludge collected from a sewage plant, and tested for biodegradation for 28 days while being aerated. After 28 days, the sheets were taken out, dried and then individually weighed. From the weight loss, obtained was the degree of biodegradation of each sheet. The data are given in Table I-2.

EXAMPLE I-13

72.0 g of acrylic acid, 30.0 g of sodium hydroxide and 60.0 g of water were put into a 500 ml separable flask equipped with a stirrer, a thermocouple and a reflux condenser, and stirred at room temperature. Next, 5.5 g of hydroquinone, 0.154 g of N,N-methylenebisacrylamide, and 15 mg of ferrous chloride tetrahydrate were added thereto and formed into a uniform solution. While this was heated in an oil bath at 80° C., 40.0 g of an aqueous solution containing 300 mg of hydrogen peroxide was dropwise added thereto over a period of 3 hours. After the addition, this was further heated for 1 hour at that temperature. After having been thus polymerized, a part of the resulting product was taken out into a stainless vat and cut into fine pieces therein with a cutter. The thus-obtained crosslinked product was powdered by the use of a shaking mill. 0.2 g of the powder was put into a small bag of non-woven fabric, leveled, and dipped in a 0.9 wt. % saline solution. After having been thus dipped in the solution for 3 minutes and 5 minutes, the bag was weighed. Based on the weight of the bag alone (blank), the degree of swelling of the crosslinked product was obtained according to the equation mentioned above. In addition, the degree of swelling of the crosslinked product in deionized water was obtained also in the same manner as above. Next, the viscosity of a 1% dispersion of the crosslinked copolymer powder was measured by the use of a B-type viscometer (25° C., 12 rpm). The data obtained are given in Table I-1. Like in Examples I-9 to I-12, the product was tested for biodegradation. The data obtained are given in Table I-2.

TABLE I-2

| Example | Crosslinked Product Used | Degree of Biodegradation (%) |
|---|---|---|
| 9 | Example 1 | 26 |
| 10 | Example 2 | 21 |
| 11 | Example 3 | 34 |
| 12 | Example 4 | 28 |
| 13 | Example 13 | 22 |

Second Aspect of the Invention

In this section, the second aspect of the invention will be simply referred to as "the invention".

The unsaturated carboxylic acid polymer of the invention is characterized in that (a) it gives, in proton nuclear magnetic resonance spectrometry, absorption peaks at least at $\delta$ of from 6.4 to 7.5 ppm and at $\delta$ of from 1.0 to 3.2 ppm, and gives a ratio of the integrated value of the peak area at $\delta$ of from 6.4 to 7.5 ppm to that of the peak area at 8 of from 1.0 to 3.2 ppm of falling between $2.2 \times 10^{-3}$ and 0.3, (b) it has a number-average molecular weight of from 500 to 1,000,000, (c) it is soluble in water, and (d) it has a degree of calcium ion-sequestering ability of at least 150 mg $CaCo_3$/g.

If giving, in proton nuclear magnetic resonance spectrometry, a ratio of the integrated value of the peak area at $\delta$ of from 6.4 to 7.5 ppm to that of the peak area at $\delta$ of from 1.0 to 3.2 ppm of smaller than $2.2 \times 10^{-3}$, the polymer could not be well biodegradable. On the other hand, if the ratio in question is larger than 0.3, the calcium ion-sequestering ability of the polymer will be poor. Accordingly, the unsaturated carboxylic acid polymer which satisfies the defined range for the ratio of the two integrated peak areas noted above is preferable. More preferably, the ratio of the integrated peak areas falls between $2.2 \times 10^{-3}$ and 0.2.

The unsaturated carboxylic acid polymer has a number-average molecular weight of from 500 to 1,000,000, preferably from 1,000 to 100,000, more preferably from 1,000 to 50,000. If having a number-average molecular weight of smaller than 500, the polymer is not well chelatable when used as a builder. On the other hand, if having a number-average molecular weight of larger than 1,000,000, the polymer is poorly biodegradable. Therefore, the number-average molecular weight of the unsaturated carboxylic acid

TABLE I-1

| Example | Crosslinking Agent (amount added*1) | Surfactant (amount added*1) | Degree of Swelling (in deionized water) | | Degree of Swelling (in saline solution) | | Viscosity (cps) |
|---|---|---|---|---|---|---|---|
| | | | 3 min | 5 min | 3 min | 5 min | |
| 1 | glycerin (5) | none | 127 | 142 | 27 | 31 | 5,400 |
| 2 | glycerin (5) | Tween 60*2 (5) | 242 | 254 | 44 | 48 | 19,900 |
| 3 | pentaerythritol (5) | Tween 60*2 (5) | 199 | 210 | 41 | 43 | 18,600 |
| 4 | pentaerythritol (3) | none | 153 | 161 | 30 | 30 | 6,100 |
| 5 | glycerin (3) | Tween 60*2 (5) | 244 | 249 | 49 | 54 | 18,700 |
| 6 | sorbitol (5) | none | 129 | 146 | 24 | 26 | 5,900 |
| 7 | glycerin (3) | none | 141 | 155 | 21 | 23 | 6,300 |
| 8 | glycerin (3) | DBS*3 (2) | 233 | 243 | 47 | 53 | 14,300 |
| 13 | N,N-methylene-bisacrylamide (0.1) | none | 324 | 346 | 52 | 53 | 19,800 |

(Notes)
*1: Ratio to the overall amount of monomers (wt. %).
*2: Polyoxyethylene-sorbitan fatty acid ester.
*3: Sodium dodecylbenzenesulfonate.

polymer of the invention is controlled to fall within the defined range as above.

For producing the unsaturated carboxylic acid polymer of the invention, an unsaturated carboxylic acid or its salt of a general formula [II-1]:

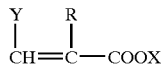

[II-1]

wherein X represents a hydrogen atom, an alkali metal atom or an ammonium group; Y represents a hydrogen atom or a group of COOX; and R represents a hydrogen atom or a methyl group, and a quinone are copolymerized in the presence of a polymerization initiator.

For the unsaturated carboxylic acid of formula [II-1], concretely, preferred are acrylic acid, methacrylic acid, maleic acid, fumaric acid, etc. One or more of these acids may be used herein either singly or as combined. When two or more of such unsaturated carboxylic acids are combined for use herein, for example, from 0 to 60 mol % of maleic acid may be combined with from 30 to 99.9 mol % of acrylic acid. The unsaturated carboxylic acids may be in the form of their anhydrides. Their salts are also usable herein, including alkali metal salts and ammonium salts. To the unsaturated carboxylic acid, if desired, optionally added is any other unsaturated compound capable of copolymerizing with the acid. The amount of the optional compound shall fall between 1 and 30% by weight. The unsaturated compound includes, for example, acrolein, vinyl acetate, alkyl acrylates, half esters of maleic acid, etc.

The quinone includes p-hydroxyphenol, o-hydroxyphenol, m-hydroxyphenol, 2-methoxyhydroquinone, tetramethylhydroquinone, p-benzoquinone, o-benzoquinone, toluquinone, naphthoquinone, anthraquinone, methoquinone, etc. Of those, especially preferred are p-hydroxyphenol and p-benzoquinone.

The polymerization initiator to be used in reacting the above-mentioned unsaturated carboxylic acid or its salt with a quinone may be, for example, a combination of hydrogen peroxide and a reducing agent, as well as percarboxylic acids, permaleic acid, etc. The reducing agent is preferably an iron ion, a copper ion, a zinc ion, a nickel ion, ascorbic acid, saccharin, etc. The amount of the polymerization initiator may fall between 0.1 and 30% by weight, preferably from 0.5 to 20% by weight of the overall amount of the starting monomers.

For the polymerization initiator, also usable are azobisisobutyronitrile, azobis-2,4-dimethylvaleronitrile, 2,2'-azobis(2-amidinopropane) dihydrochloride, 4,4'-azobis (4-cyanovaleric acid), azobiscyclohexanecarbonitrile, tetramethylthiuram disulfide, etc. In case where the azo-type polymerization initiator is used, its amount may fall between 0.1 and 10% by weight, preferably between 0.5 and 5% by weight of the overall amount of the starting monomers. If the amount of the polymerization initiator is smaller than the defined range, the yield of the polymer could not be satisfactorily high. However, even if the amount is larger than the defined range, it will not produce any better result.

When the unsaturated carboxylic acid or salt is reacted with a quinone, a chain transfer agent of a general formula [II-2]:

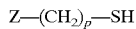

[II-2]

wherein Z represents a hydroxyl group or an amino group; and p indicates an integer of from 1 to 6, may be used in the reaction. Specific examples of the chain transfer agent are mercaptoethyl alcohol, mercaptopropyl alcohol, mercaptobutyl alcohol, aminoethanethiol, etc. Of those compounds, especially preferred is mercaptoethyl alcohol. The amount of the chain transfer agent to be used may fall generally between 0.5 and 20% by weight, or between 1 and 20% by weight, preferably between 1 and 15% by weight, or between 3 and 15% by weight of the overall amount of the starting monomers. If its amount is smaller than 0.5% by weight, the agent added will be ineffective; but if larger than 20% by weight, the chelatability of the polymer produced will be poor.

In producing the unsaturated carboxylic acid polymer, in general, no solvent is used, or an aqueous solvent is used. As the case may be, a non-aqueous solvent may also be used. The non-aqueous solvent includes acetone, dimethylformamide, dimethylacetamide, ethyl acetate, N-methylpyrrolidone, benzene, toluene, xylene, dioxane, etc. The polymerization is preferably effected in an aqueous solvent. However, in case where it is effected in a non-aqueous solvent, the solvent is preferably acetone.

The reaction condition may be suitably determined. For example, the pressure may fall between atmospheric pressure and 10 kg/cm$^2$(G), but preferably between atmospheric pressure and 5 kg/cm$^2$(G); the temperature may fall between 30 and 150° C., but preferably between 50 and 120° C. The polymerization time varies, depending on the type of the starting compounds and on the polymerization temperature, but may fall generally between 10 minutes and 20 hours, preferably between 1 and 10 hours.

The biodegradable builder of the invention that comprises the unsaturated carboxylic acid polymer obtained in the manner as above is highly water-soluble, chelatable and biodegradable, and is suitable for detergent.

The unsaturated carboxylic acid polymer may be combined with a surfactant to give a biodegradable detergent composition. The surfactant may be any of anionic surfactants, cationic surfactants, nonionic surfactants, ampholytic surfactants, etc.

In the detergent composition, the blend ratio of the builder and the surfactant is preferably such that the two each account for from 10 to 50% by weight of the overall weight of the detergent composition. Preferably, the detergent composition contains any of enzyme, bleaching agents, inorganic builders (e.g., zeolite, sodium carbonate) for the balance.

For the anionic surfactants, for example, preferred are soap of fatty acids, salts of alkyl ether carboxylic acids, salts of N-acylamino acids, salts of alkylbenzenesulfonic acids, salts of alkylnaphthalenesulfonic acids, salts of dialkylsulfosuccinates, salts of α-olefinsulfonic acids, salts of higher alcohol sulfates, salts of alkyl ether sulfuric acids, salts of polyoxyethylene-alkylphenyl ether sulfuric acids, salts of fatty acid alkylolamide sulfates, salts of alkyl ether phosphates, salts of alkyl phosphates, etc.

For the anionic surfactants, preferred are salts of aliphatic amines, aliphatic quaternary ammonium salts, benzalkonium salts, benzetonium chloride, pyridinium salts, imidazolium salts, etc.

For the nonionic surfactants, preferred are polyoxyethylene alkyl ethers, polyoxyethylene alkyl phenyl ethers, polyoxyethylene-polyoxypropylene block polymers, polyoxyethylene-polyoxypropylene alkyl ethers, polyoxyethylene-glycerin fatty acid esters, polyoxyethylene-castor oil, polyoxyethylene-sorbitan fatty acid esters, polyoxyethylene-sorbitol fatty acid esters, polyethylene glycol fatty acid esters, fatty acid monoglycerides, polyglycerin fatty acid esters, sorbitan fatty acid esters, fatty acid alkanolamides, polyoxyethylene fatty acid amides, polyoxyethylene-alkylamines, alkylamine oxides, etc.

For the ampholytic surfactants, for example, preferred are carboxybetaine-type compounds, salts of aminocarboxylic acids, imidazolium betaine, etc.

The unsaturated carboxylic acid polymer of the invention may be neutralized with an alkali in an ordinary manner, for example, with an aqueous solution of sodium hydroxide or potassium hydroxide, into a hydrophilic polymer of which the main chain is composed of unsaturated carboxylic acid monomers and which has a number-average molecular weight of from 1,000 to 100,000. Because of its chemical structure, the polymer is highly biodegradable. Therefore, it is highly useful for dispersants for inorganic pigments such as calcium carbonate, clay and the like for coating agents for paper, etc., as its load to the environment is low.

To prepare the coating agents, from 0.05 to 2.0 parts by weight of a dispersant that comprises the polymer may be added to 100 parts by weight of an inorganic pigment such as calcium carbonate, clay or the like, and the resulting mixture may be dispersed in water. Containing the dispersant, the coating agents have the advantages of low viscosity and high fluidity. In preparing the coating agents, the dispersant may be used alone, or may be combined with any other additives such as polyvinyl alcohol, etc.

As being highly chelatable, the unsaturated carboxylic acid polymer of the invention is also usable as a scale inhibitor in various devises of coolant systems, water pipe lines in boilers, etc.

The invention is described in more detail with reference to the following Examples, in which the number-average molecular weight, the $^1$H-NMR data, the calcium ion-sequestering ability, the biodegradability, the detergency and the dispersibility of the polymers produced were measured and evaluated according to the methods mentioned below.

(1) Number-average Molecular Weight:

The molecular weight of each sample is measured through gel permeation chromatography (GPC), using polyacrylic acid as the standard substance.

For this, used is a Nippon Bunko's system, GPC-900 Model [detector: built-in differential diffractometer, column: Shodex Asahipak (GF-7M HQ and GF-310 HQ)]. The mobile phase is acetonitrile/1 mM $NaH_2PO_4$ and 7 mM $Na_2HPO_4$ (3/7); the column temperature is 40° C.; the flow rate is 0.7 ml/min; and the amount of the sample charged is 200 μl.

(2) $^1$H-NMR:

For this, used is a JEOL's system, GX-270 Model. A solution of a polymer sample in a solvent of heavy water, having a polymer concentration of smaller than 5% by weight, is put into a test tube having a diameter of 5 mm, and subjected to $^1$H-NMR at room temperature in an NON mode at 270 MHz, and the data are integrated 50 times.

(3) Calcium Ion-sequestering Ability:

Just 20 mg of a polymer sample is put into a 200 ml beaker, to which is added 100 g of an aqueous solution containing 0.1 N calcium chloride, 0.1 N potassium chloride and 0.4 N ammonia and having a Ca ion concentration of 40 ppm, and the polymer sample is dissolved in the aqueous solution. The divalent Ca ion concentration in the resulting solution is measured, using a Ca ion electrode. The amount of calcium ions as trapped by 1 g of the polymer is obtained in terms of $CaCO_3$, which indicates the $Ca^{2+}$-sequestering ability (mg.$CaCo_3$/g) of the polymer.

(4) Biodegradability:

According to JIS K6950, each polymer sample is tested for 28-day biodegradation with activated sludge. From TOC (total organic carbon) of the sample thus tested, obtained is the degree of biodegradability of the polymer.

(5) Detergency:

An artificial soiling composition comprised of the following components is prepared:

| | |
|---|---|
| Organic Soiling Matter | 69.7 wt.pts. |
| Burnt Clay | 29.8 wt.pts. |
| Carbon Black | 0.5 wt.pts. |

The organic soiling matter is comprised of the following substances in the ratio as below:

| | |
|---|---|
| Oleic Acid | 28.3 wt.pts. |
| Triolein | 15.6 wt.pts. |
| Cholesterol-olein | 12.2 wt.pts. |
| Liquid Paraffin | 2.5 wt.pts. |
| Squalene | 2.5 wt.pts. |
| Cholesterol | 1.6 wt.pts. |
| Gelatin | 7.0 wt.pts. |
| Total | 69.7 wt.pts. |

Clean fabric is soiled with this artificial soiling composition in an wet system using an aqueous solvent, and the thus-soiled fabric is cut into pieces of 5 cm×5 cm each. These pieces have a degree of reflectivity of from 38 to 43%. The surface reflectivity of each soiled piece is measured. These soiled pieces are subjected to a washing test under the condition mentioned below.

| | |
|---|---|
| Washing Tester: | Terg-O-Tometer, |
| Number of Revolutions: | 120 rpm, |
| Hardness of Water: | 90 ppm (in terms of $CaCO_3$), |
| Amount of Washing Liquid: | 900 ml, |
| Washing Temperature: | 30° C., |
| Concentration of Detergent: | 0.067%, |
| Bath Ratio: | 30 times, |
| Washing Time: | 10 minutes, |
| Rinsing Time: | Two times for 3 minutes each, |
| Drying: | Sandwiched between sheets of filter paper and dried by ironing. |

Next, the surface reflectivity of the washed test piece is measured, and the detergency of the detergent tested is obtained according to the following equation.

$$\text{Detergency (\%)} = \frac{K/S \text{ of soiled fabric} - K/S \text{ of washed fabric}}{K/S \text{ of soiled fabric} - K/S \text{ of clean fabric}} \times 100$$

wherein;

$K/S=(1-R)^2/2R$ (Kubelka-Munk's equation) in which R indicates the surface reflectivity of fabric.

(6) Dispersibility:

100 ml of an aqueous dispersion containing 10 ppm by weight of a polymer sample and 1% by weight of activated clay is stirred for 10 minutes, and put into a 100 ml mess-cylinder. This is kept static for 14 hours. Next, 5 ml of the supernatant is sampled out, and its absorbance at 400 nm is measured. This indicates the dispersibility of the dispersion tested.

EXAMPLE II-1

5.88 g of maleic anhydride, 9 g of water and 4.8 g of sodium hydroxide were put into a 100 ml separable flask equipped with a stirrer and a thermocouple. Next, 4.3 g of acrylic acid and then 0.64 g of hydroquinone were added thereto in that order. 30 mg, in terms of absolute ferrous chloride, of ferrous chloride tetrahydrate (this is combined with hydrogen peroxide and serves as a reducing agent) was added to it, and heated at 60° C.

Next, 3.4 g of aqueous 60 wt. % hydrogen peroxide was dropwise added to the reaction mixture with stirring over a period of 15 minutes. After the addition, this was further stirred for 3 hours at 60° C., at which the monomers were reacted. The resulting reaction product was lyophilized, and the unsaturated carboxylic acid polymer thus obtained weighed 13.9 g (yield: 95%).

In its $^1$H-NMR, the unsaturated carboxylic acid polymer obtained herein gave a ratio of the integrated value of the peak area at δ of from 6.4 to 7.5 ppm to that of the peak area at of from 1.0 to 3.2 ppm of 0.019. Based on the ratio, the content of the structural units of hydroquinone residues in the unsaturated carboxylic acid polymer was calculated and was 5 mol %. The number-average molecular weight of the polymer was 2,100; and the weight-average molecular weight thereof was 2,900.

The calcium-sequestering ability of the polymer measured according to the method mentioned above was 210 mg/g; and the biodegradability thereof was 85%.

The data are given in Table II-1. In the Table, "Example II-1" is simply referred to as "Example 1", and the same shall apply to Comparative Examples. The same simplified expression shall apply hereinunder.

EXAMPLE II-2

In the same manner as in Example II-1, obtained was 13.4 g (yield: 92%) of an unsaturated carboxylic acid polymer, for which, however, the amount of hydroquinone used was 0.32 g, and 30 mg, in terms of absolute ferric chloride, of ferric chloride hexahydrate (this is combined with hydrogen peroxide and serves as a reducing agent) was used in place of ferrous chloride tetrahydrate.

The unsaturated carboxylic acid polymer obtained herein was analyzed and evaluated, and the data of its properties are given in Table II-1.

EXAMPLE II-3

In the same manner as in Example II-1, obtained was 14.0 g (yield: 96%) of an unsaturated carboxylic acid polymer, for which, however, the amount of ferrous chloride tetrahydrate (this is combined with hydrogen peroxide and serves as a reducing agent) used was 7 mg in terms of absolute ferrous chloride, and the time taken for dropwise adding aqueous 60 wt. % hydrogen peroxide to the system was 60 minutes.

The unsaturated carboxylic acid polymer obtained herein was analyzed and evaluated, and the data of its properties are given in Table II-1.

EXAMPLE II-4

In the same manner as in Example II-1, obtained was 14.2 g (yield: 97%) of an unsaturated carboxylic acid polymer, for which, however, 0.63 g of p-benzoquinone, a type of quinones, was used in place of hydroquinone, and the amount of ferrous chloride tetrahydrate used was 15 mg in terms of absolute ferrous chloride.

The unsaturated carboxylic acid polymer obtained herein was analyzed and evaluated, and the data of its properties are given in Table II-1.

COMPARATIVE EXAMPLE II-1

1.96 g of maleic anhydride, and a solution of 0.8 g of sodium hydroxide in 2 g of water were put into a 100 ml separable flask equipped with a stirrer and a thermocouple, and heated at 100° C. To this were dropwise added a solution of 13.7 g of maleic anhydride, 6.35 g of aqueous 60 wt. % hydrogen peroxide and 11.52 g of acrylic acid, and a solution of 12 g of sodium hydroxide in 12 g of water, at the same time over a period of 30 minutes.

After the addition, the product was lyophilized. The unsaturated carboxylic acid polymer thus obtained weighed 35.9 g (yield: 94%).

The unsaturated carboxylic acid polymer obtained herein was analyzed and evaluated, and the data of its properties are given in Table II-1.

TABLE II-1

| | Ratio of Integrated Peak Areas in $^1$H-NMR | Quinone Content (mol %) | Number-average Molecular Weight | Weight-average Molecular Weight | $Ca^{2+}$-sequestering Ability (mg/g) | Biodegradability (%) |
|---|---|---|---|---|---|---|
| Example 1 | 0.019 | 5 | 2,100 | 2,900 | 210 | 85 |
| Example 2 | 0.007 | 2.5 | 1,980 | 14,890 | 224 | 83 |
| Example 3 | 0.008 | 5 | 2,150 | 23,600 | 224 | 80 |
| Example 4 | 0.016 | 5 | 2,180 | 39,900 | 261 | 84 |
| Comp. Example 1 | — | — | 8,360 | 49,100 | 251 | 5 |

EXAMPLES II-5 to II-8

Each unsaturated carboxylic acid polymer obtained in Examples II-1 to II-4 was tested for its ability to assist dispersion, according to the method mentioned above.

The data of the polymer that assists dispersion are given in Table II-2. The absorbance of the polymer only was 0.100; and the absorbance of the blank was 0.000.

TABLE II-2

| Example | Polymer Used | Absorbance |
|---|---|---|
| Example 5 | Polymer of Example 1 | 0.135 |
| Example 6 | Polymer of Example 2 | 0.134 |
| Example 7 | Polymer of Example 3 | 0.129 |
| Example 8 | Polymer of Example 4 | 0.131 |

EXAMPLES II-9 to II-12

Each unsaturated carboxylic acid polymer obtained in Examples II-1 to II-4 was dissolved in water, and adjusted to have a pH of 10 with sodium hydroxide added thereto. Then, this was lyophilized. A detergent composition comprising the components shown in Table II-3 and containing the lyophilized polymer (this serves as a builder) was prepared, and tested for detergency according to the method mentioned above. The data are given in Table II-3.

In the Table showing the detergent composition, LAS is sodium linear alkylbenzenesulfonate, AS is sodium alkylsulfate, and PEG is polyethylene glycol.

COMPARATIVE EXAMPLES II-2 and II-3

The same process as in Examples II-9 to II-12 was repeated. In this, however, used was a conventional builder, A-type zeolite and not the unsaturated carboxylic acid polymer used in Examples II-9 to II-12. The data are given in Table II-3.

TABLE II-3

| Example (Comparative Example) | 9 | 10 | 11 | 12 | (2) | (3) |
|---|---|---|---|---|---|---|
| Components of Detergent Composition (wt. %) | | | | | | |
| Polymer of Examples 1 to 5 | 20 | 20 | 20 | 20 | — | — |
| LAS | 25 | 20 | 25 | 20 | 25 | 20 |
| AS | 10 | 10 | 10 | 10 | 10 | 10 |
| Nonionic Surfactant | — | 5 | — | 5 | — | 5 |
| A-type Zeolite | — | — | — | — | 20 | 20 |
| Sodium Silicate | 10 | 10 | 10 | — | 10 | 10 |
| PEG | 2 | 2 | 2 | — | 2 | 2 |
| Sodium Carbonate | 20 | 15 | 20 | — | 20 | 15 |
| Sodium Sulfate | — | 5 | — | — | — | 5 |
| Water | balance | balance | balance | balance | balance | balance |
| Detergency (%) | 65 | 65 | 63 | 65 | 50 | 52 |

[Third Aspect of the Invention]

In this section, the third aspect of the invention will be simply referred to as "the invention".

The unsaturated carboxylic acid polymer of this invention comprises (A) from 30 to 99 mol % of repetitive units (a) of formula [III-1], (B) from 0 to 69.9 mol % of repetitive units (b) of formula [III-2], (C) from 0.1 to 50 mol % of structural units that are the total of repetitive units (c) of formula [III-3], repetitive units (d) of formula [III-4], and repetitive units (e) of formula [III-5], and has a number-average molecular weight of from 500 to 1,000,000.

For the structural units (A) constituting the unsaturated carboxylic acid polymer, the content of the repetitive units (a) of formula [III-1 in the polymer falls between 30 and 99 mol %, but preferably between 40 and 80 mol %. If the content of the repetitive units (a) therein is smaller than 30 mol %, the polymer will be poorly effective in detergent; but if larger than 99 mol %, the polymer will be poorly biodegradable.

For the structural units (B) constituting the unsaturated carboxylic acid polymer, the content of the repetitive units (b) of formula [III-2] in the polymer falls between 0 and 69.9 mol %. Even if the polymer does not contain the repetitive units (b), it is still biodegradable and can sequester calcium ions, and therefore it is effective as a builder and as a detergent ingredient. More preferably, however, the content of the repetitive units (b) in the polymer falls between 20 and 60 mol %.

For the structural units (C) constituting the unsaturated carboxylic acid polymer, the overall content of the repetitive units (c) of formula [III-3], the repetitive units (d) of formula [III-4] and the repetitive units (e) of formula [III-5] falls between 0.1 and 50 mol %, preferably between 0.2 and 49 mol %. Regarding these three types of repetitive units, only the repetitive units (c) may be combined with the repetitive units (a) or the repetitive units (a) and (b) to constitute the polymer; or only the repetitive units (d) may be combined with them; or only the repetitive units (e) may be combined with them. The repetitive units (c) and (d) may be combined with the repetitive units (a) or with the repetitive units (a) and (b); or the repetitive units (c) and (e) may be combined with them; or the repetitive units (d) and (e) may be combined with them; or all types of the repetitive units (c), (d) and (e) may be combined with them.

Partially or all together combined with the repetitive units (a) or with the repetitive units (a) and (b) to constitute the unsaturated carboxylic acid polymers, the repetitive units (c), (d) and (e) make little difference to the physical properties of the polymers. Rather than the type of these repetitive units, the content of the quinone residues bonded to the side chains of the polymers has more significant influences on the chemical and physical properties of the polymers. Specifically, the polymers having a larger content of these repetitive units (c), (d) and (e) are more highly biodegradable.

The unsaturated carboxylic acid polymer of the invention has a number-average molecular weight of from 500 to 1,000,000, preferably from 1,000 to 100,000, more preferably from 1,000 to 50,000. If its number-average molecular weight is smaller than 500, the polymer could not exhibit its calcium ion-sequestering ability to a desired degree when used as a builder; but if larger than 1,000,000, the polymer will be poorly biodegradable.

To produce the unsaturated carboxylic acid polymer, an unsaturated carboxylic acid or its salt may be copolymerized with a quinone in the presence of a polymerization initiator.

Concretely, the starting unsaturated carboxylic acid includes acrylic acid, maleic acid, and fumaric acid. Of those, acrylic acid alone may be used; or in case where two or more are used, for example, from 50 to 99 mol % of acrylic acid may be combined with from 1 to 50 mol % of maleic acid or fumaric acid. The unsaturated carboxylic acids to be used may be in the form of their anhydrides. Their salts, such as alkali metal salts, e.g., sodium salts, potassium salts, etc., as well as ammonium salts are also preferred for use herein.

The quinone may be any of hydroquinones, p-benzoquinone, o-benzoquinone and their substituted derivatives.

The polymerization initiator to be used in the reaction of the unsaturated carboxylic acid or its salt with a quinone includes, for example, a combination of hydrogen peroxide and a reducing agent, as well as percarboxylic acids, permaleic acids, etc. For the reducing agent, preferred are iron ions, copper ions, zinc ions, nickel ions, ascorbic acid, saccharin, etc. The amount of the polymerization initiator to be used may fall between 0.1 and 30% by weight, but preferably between 0.5 and 20% by weight of the overall amount of the starting monomers, unsaturated carboxylic acid or its salt and quinone.

As the polymerization initiator, also employable are azobisisobutyronitrile, azobis-2,4-dimethylvaleronitrile, azobiscyclohexanecarbonitrile, tetramethylthiuram disulfide, etc. The amount of the azo-type polymerization initiator to be used may fall between 0.1 and 15% by weight, but preferably between 0.5 and 10% by weight of the overall amount of the starting monomers, unsaturated carboxylic acid or its salt and quinone. If the amount of the polymerization initiator used is smaller than the defined range, the amount of the non-reacted monomers will increase; but if larger than the defined range, the polymers produced could not have a sufficiently high molecular weight.

If desired, a chain transfer agent may be used in the reaction of the unsaturated carboxylic acid or its salt with a quinone. The chain transfer agent includes, for example, mercaptoethyl alcohol, mercaptopropyl alcohol, mercaptobutyl alcohol, aminoethanethiol, etc. Of those, especially preferred is mercaptoethyl alcohol. The amount of the chain transfer agent to be used may fall generally between 0 and 20% by weight, but preferably between 1 and 15% by weight, more preferably between 3 and 15% by weight of the overall amount of the starting monomers, unsaturated carboxylic acid or its salt and quinone. If it is larger than 20% by weight, the calcium ion-sequestering ability of the polymers produced will be poor.

In producing the unsaturated carboxylic acid polymer, in general, no solvent is used, or an aqueous solvent is used. As the case may be, a non-aqueous solvent may be used. For the details of the non-aqueous solvent, referred to are the same as those mentioned in the section of the second aspect of the invention. To produce the polymer, the monomers are polymerized preferably in the presence of no solvent. However, in case where they are polymerized in a non-aqueous solvent, acetone is preferred for the solvent.

For the details of the reaction condition in producing the polymer, referred to are the same as those mentioned in the section of the second aspect of the invention.

When used as a detergent builder, the unsaturated carboxylic acid polymer of the invention thus obtained in the manner as above is highly chelatable and biodegradable. Therefore, the polymer is favorable to biodegradable builders.

The unsaturated carboxylic acid polymer may be combined with a surfactant to give a biodegradable detergent composition. The surfactant may be any of anionic surfactants, cationic surfactants, nonionic surfactants, ampholytic surfactants, etc.

In the detergent composition, the blend ratio of the builder and the surfactant is preferably such that the two each account for from 10 to 40% by weight of the overall weight of the detergent composition. Preferably, the detergent composition contains any of enzyme, bleaching agents, inorganic builders (e.g., zeolite, sodium carbonate) for the balance accounting for from 20 to 80% by weight.

For the details of the anionic surfactants, the cationic surfactants, the nonionic surfactants and the ampholytic surfactants usable herein, referred to are the same as those mentioned in the section of the second aspect of the invention.

The unsaturated carboxylic acid polymer of the invention may be neutralized with an alkali in an ordinary manner, for example, with an aqueous solution of sodium hydroxide or potassium hydroxide, into a hydrophilic polymer of which the main chain is composed of unsaturated carboxylic acid monomers and which has a number-average molecular weight of from 1,000 to 100,000. Because of its chemical structure, the polymer is also highly biodegradable. Therefore, it is highly useful for dispersants for inorganic pigments such as calcium carbonate, clay and the like for coating agents for paper, etc.

To prepare the coating agents, from 0.05 to 2.0 parts by weight of a dispersant that comprises the polymer may be added to 100 parts by weight of an inorganic pigment such as calcium carbonate, clay or the like, and the resulting mixture may be dispersed in water. Containing the dispersant, the coating agents have the advantages of low viscosity and high fluidity. In preparing the coating agents, the dispersant may be used alone, or may be combined with any other additives such as polyvinyl alcohol, etc.

As being highly chelatable, the unsaturated carboxylic acid polymer of the invention is also usable as a scale inhibitor in various devices of coolant systems, water pipe lines in boilers, etc.

The invention is described in more detail with reference to the following Examples.

EXAMPLE III-1

(1) Production of Unsaturated Carboxylic Acid Polymer:

9.8 g of maleic anhydride was put into a 100 ml separable flask equipped with a stirrer and a thermocouple, to which was added a solution of 8 g of sodium hydroxide in 8 g of water. Next, 7.2 g of acrylic acid and then 1.1 g of hydroquinone were added thereto in that order. 0.4 mg, in terms of $FeCl_2$, of ferrous chloride tetrahydrate serving as a reducing agent was added to it, and heated at 120° C.

Next, 2.8 g of aqueous 60 wt. % hydrogen peroxide was dropwise added to the resulting solution with stirring over a period of 5 hours. 30 minutes after the start of the hydrogen peroxide addition, 2.88 g of acrylic acid was dropwise added to the mixture over a period of 4 hours and 30 minutes. 4 hours after the start of the hydrogen peroxide addition, 1.68 g of aqueous 60 wt. % hydrogen peroxide was dropwise added to the mixture over a period of 1 hour. After the addition, the mixture was further stirred for 1 hour under heat at 120° C., at which the monomers were reacted.

The resulting reaction product was lyophilized, and the solid polymer thus obtained weighed 26.0 g (yield: 96%).

The number-average molecular weight of the polymer thus obtained was measured in gel permeation chromatography (GPC) based on a standard substance, polyacrylic acid, and was 6,100. The weight-average molecular weight of the polymer was 47,000.

Figure 5:
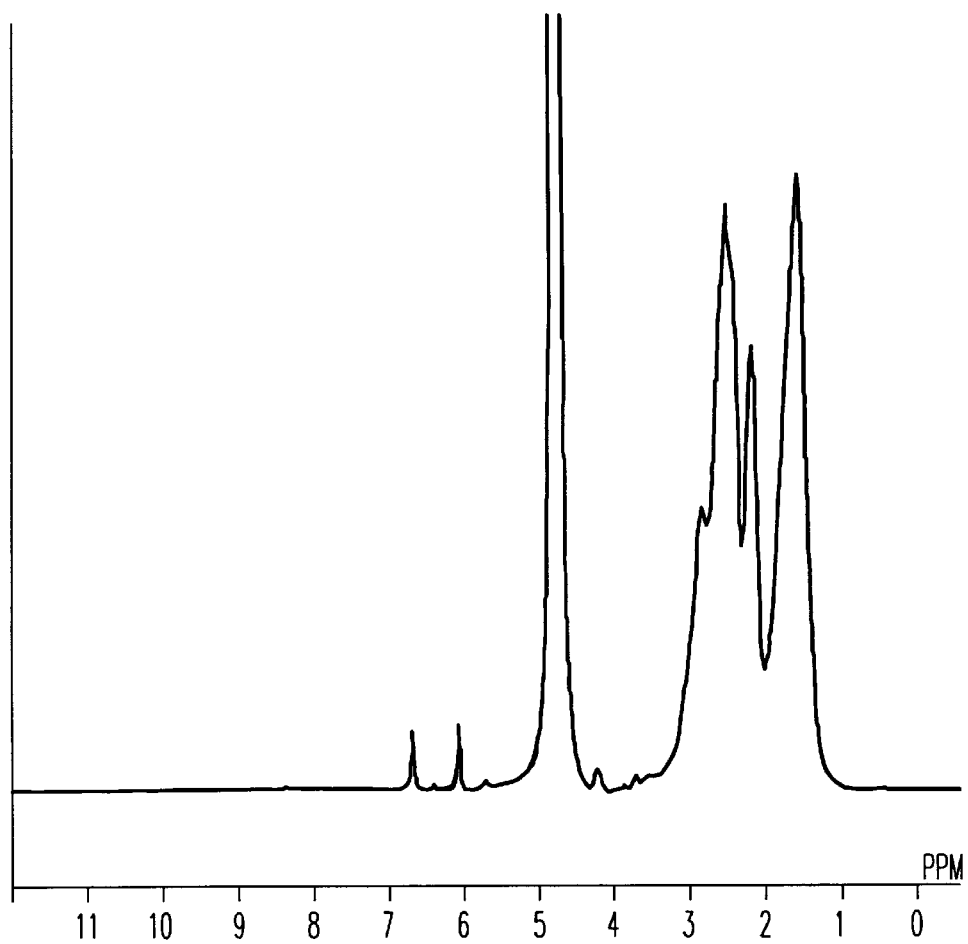
FIGS. 5 and 6 are the ¹H-NMR spectral charts of the unsaturated carboxylic acid polymers obtained in Example II-1 and Example II-2, respectively.

The polymer was analyzed by the use of an NMR device at 270 MHz. In its $^1$H-NMR chart (see FIG. 5), seen was a quinone skeleton-derived absorption peak in a range of from 6.7 to 7.2 ppm. For analyzing it herein, the polymer was purified through reprecipitation, and used as the sample. The hydroquinone residue content of the polymer was 0.4 mol %.

From the data, the chemical structure of the polymer obtained herein was identified as that shown in Table III-1.

(2) Evaluation of Calcium Ion-sequestering Ability:

20 mg of the polymer obtained in (1) was put into a 200 ml beaker, to which was added 100 g of an aqueous solution containing 0.1 N calcium chloride, 0.1 N potassium chloride and 0.4 N ammonia and having a Ca ion concentration of 40 ppm, and the polymer was dissolved in the aqueous solution.

Next, the divalent calcium ion concentration in the resulting solution was measured, using a calcium ion electrode. The amount of calcium carbonate (mg) as trapped by 1 g of the polymer was obtained, which indicates the calcium ion-sequestering ability of the polymer. Thus measured, the calcium ion-sequestering ability of the polymer obtained in (1) was 309 mg/g.

(3) Evaluation of Biodegradability:

The polymer obtained in (1) was tested for biodegradability according to JIS K6950. The biodegradability was obtained from TOC (total organic carbon) of the polymer. As a result, the biodegradability of the polymer obtained in (1) was 80%.

The data are all given in Table III-2. In the Table, "Example III-1" is simply referred to as "Example 1", and the same shall apply to Comparative Examples.

EXAMPLE III-2

(1) Production of Unsaturated Carboxylic Acid Polymer:

9.8 g of maleic anhydride was put into a 100 ml separable flask equipped with a stirrer and a thermocouple, to which was added a solution of 8 g of sodium hydroxide in 11.4 g of water. Next, 7.2 g of acrylic acid and then 3.3 g of hydroquinone were added thereto in that order. 30 mg, in terms of $FeC_2$, of ferrous chloride tetrahydrate serving as a reducing agent was added to it, and heated at 80° C.

Next, 7.28 g of aqueous 60 wt. % hydrogen peroxide was dropwise added to the resulting solution with stirring over a period of 5 hours. After the addition, the mixture was further stirred for 1 hour under heat at 80° C., at which the monomers were reacted.

The resulting reaction product was lyophilized, and the solid polymer thus obtained weighed 25.2 g (yield: 93%).

The number-average molecular weight of the polymer thus obtained was measured in gel permeation chromatography (GPC) based on a standard substance, polyacrylic acid, and was 3,600. The weight-average molecular weight of the polymer was 55,000.

Figure 6:
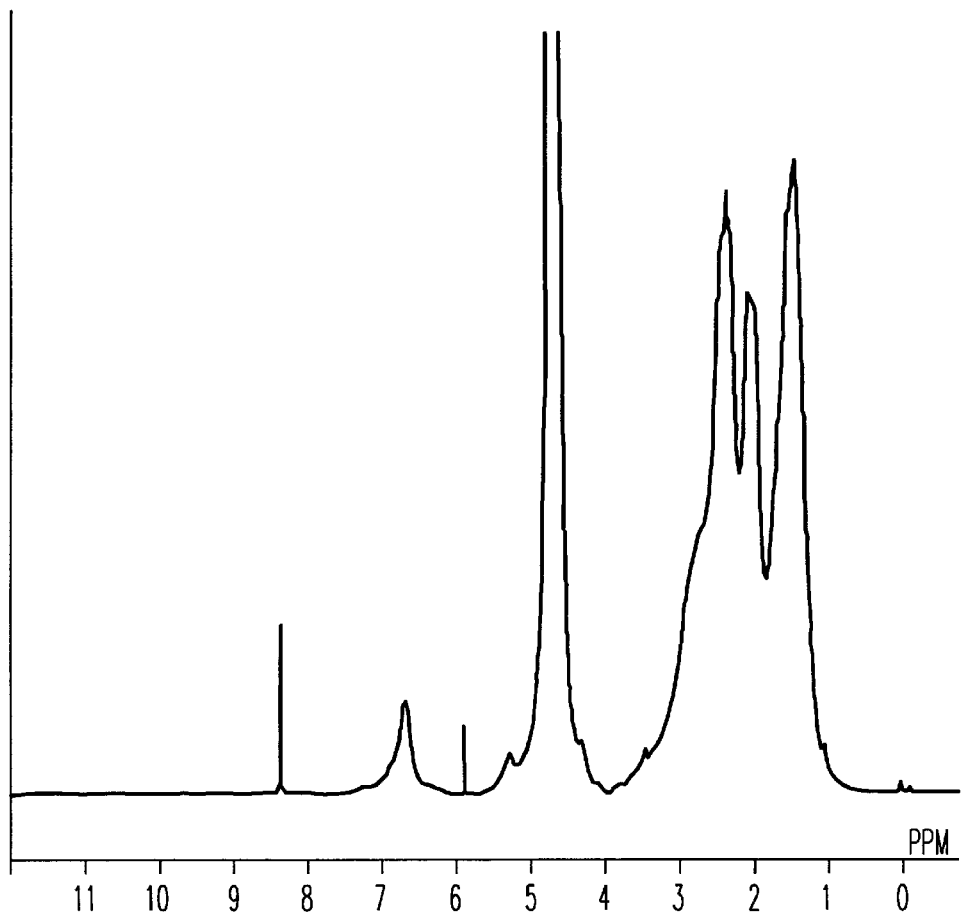

The polymer was analyzed by the use of an NMR device at 270 MHz. In its $^1$H-NMR chart (see FIG. 6), seen was a quinone skeleton-derived absorption peak in a range of from 6.7 to 7.2 ppm. For analyzing it herein, the polymer was purified through reprecipitation, and used as the sample. The hydroquinone residue content of the polymer was 3.6 mol %.

From the data, the chemical structure of the polymer obtained herein was identified as that shown in Table III-1.

(2) Evaluation of Calcium Ion-sequestering Ability:

The calcium ion-sequestering ability of the polymer obtained in (1) was measured in the same manner as in Example II-1 (2), and was 270 mg/g.

(3) Evaluation of Biodegradability:

The biodegradability of the polymer obtained in (1) was measured in the same manner as in Example III-1 (3), and was 87%.

The data are given in Table III-2.

EXAMPLE III-3

(1) Production of Unsaturated Carboxylic Acid Polymer:

In the same manner as in Example III-2 (1), obtained was an unsaturated carboxylic acid polymer, for which, however, the amount of aqueous 60 wt. % hydrogen peroxide used was 5.6 g, and that of ferrous chloride tetrahydrate used was 50 mg in terms of $FeCl_2$. The polymer weighed 24.1 g (yield: 89%).

The number-average molecular weight of the polymer obtained herein was 3,900; and the weight-average molecular weight thereof was 57,000.

The chemical structure of the polymer obtained herein was identified as that shown in Table III-1.

(2) Evaluation of Calcium Ion-sequestering Ability:

The calcium ion-sequestering ability of the polymer obtained in (1) was measured in the same manner as in Example III-1 (2), and was 260 mg/g.

(3) Evaluation of Biodegradability:

The biodegradability of the polymer obtained in (1) was measured in the same manner as in Example III-1 (3), and was 89%.

The data are given in Table III-2.

EXAMPLE III-4

(1) Production of Unsaturated Carboxylic Acid Polymer:

In the same manner as in Example III-1 (1), obtained was an unsaturated carboxylic acid polymer, for which, however, used was 1.08 g of p-benzoquinone and not hydroquinone. The polymer weighed 25.7 g (yield: 95%).

The number-average molecular weight of the polymer obtained herein was 5,200; and the weight-average molecular weight thereof was 43,000.

The chemical structure of the polymer obtained herein was identified as that shown in Table III-1.

(2) Evaluation of Calcium Ion-sequestering Ability:

The calcium ion-sequestering ability of the polymer obtained in (1) was measured in the same manner as in Example III-1 (2), and was 300 mg/g.

(3) Evaluation of Biodegradability:

The biodegradability of the polymer obtained in (1) was measured in the same manner as in Example III-1 (3), and was 78%.

The data are given in Table III-2.

EXAMPLE III-5

(1) Production of Unsaturated Carboxylic Acid Polymer:

In the same manner as in Example III-2 (1), obtained was an unsaturated carboxylic acid polymer, for which, however, used was 3.24 g of p-benzoquinone and not hydroquinone. The polymer weighed 23.8 g (yield: 88%).

The number-average molecular weight of the polymer obtained herein was 3,300; and the weight-average molecular weight thereof was 52,000.

The chemical structure of the polymer obtained herein was identified as that shown in Table III-1.

(2) Evaluation of Calcium Ion-sequestering Ability:

The calcium ion-sequestering ability of the polymer obtained in (1) was measured in the same manner as in Example III-1 (2), and was 265 mg/g.

(3) Evaluation of Biodegradability:

The biodegradability of the polymer obtained in (1) was measured in the same manner as in Example III-1 (3), and was 85%.

The data are given in Table III-2.

COMPARATIVE EXAMPLE III-1

(1) Production of Unsaturated Carboxylic Acid Polymer:

1.96 g of maleic anhydride, and a solution of 0.8 g of sodium hydroxide in 2 g of water were put into a 100 ml separable flask equipped with a stirrer and a thermocouple, and heated at 100° C.

To this were dropwise added a solution of 13.7 g of maleic anhydride, 6.35 g of aqueous 60 wt. % hydrogen peroxide and 11.52 g of acrylic acid, and a solution of 12 g of sodium hydroxide in 12 g of water, at the same time over a period of 30 minutes with stirring.

After the addition, the reaction product was lyophilized. The copolymer of maleic acid and acrylic acid thus obtained weighed 35.9 g (yield: 94%).

The number-average molecular weight of the copolymer obtained herein was 8,360; and the weight-average molecular weight thereof was 49,100.

(2) Evaluation of Calcium Ion-sequestering Ability:

The calcium ion-sequestering ability of the copolymer obtained in (1) was measured in the same manner as in Example III-1 (2), and was 251 mg/g.

(3) Evaluation of Biodegradability:

The biodegradability of the copolymer obtained in (1) was measured in the same manner as in Example III-1 (3), and was 5%.

The data are given in Table III-2.

TABLE III-1

| Example | Repetitive Units (a) (mol %) | Repetitive Units (b) (mol %) | Repetitive Units (c) to (e) (mol %) |
|---|---|---|---|
| 1 | 43.0 | 56.6 | 0.4 |
| 2 | 42.3 | 54.1 | 3.6 |
| 3 | 41.4 | 54.8 | 3.8 |
| 4 | 43.5 | 55.6 | 0.9 |
| 5 | 42.3 | 54.5 | 3.2 |

TABLE III-2

| Example Comp. Example | Yield (g) | Yield (%) | Number-average Molecular Weight | Weight-average Molecular Weight | $Ca^{2+}$-sequestering Ability (mg/g) | Biodegradability (%) |
|---|---|---|---|---|---|---|
| Example 1 | 26.0 | 96 | 6,100 | 47,000 | 309 | 80 |
| Example 2 | 25.2 | 93 | 3,600 | 55,000 | 270 | 87 |
| Example 3 | 24.1 | 89 | 3,900 | 57,000 | 260 | 89 |
| Example 4 | 25.7 | 95 | 5,200 | 43,000 | 300 | 78 |
| Example 5 | 23.8 | 88 | 3,300 | 52,000 | 265 | 85 |
| Comp. Example 1 | 35.9 | 94 | 8,360 | 49,100 | 251 | 5 |

Example III-6

(1) Preparation of Detergent Composition:

The polymer obtained in Example III-1 (1) was dissolved in water, and adjusted to have a pH of 10 with sodium hydroxide added thereto. This was used as a builder.

To 20 parts by weight of the builder, added were 25 parts by weight of sodium linear alkylbenzenesulfonate [LAS in Table III-3] and 10 parts by weight of sodium alkylsulfate (AS in Table III-3) both serving as a surfactant, and other additives, 10 parts by weight of sodium silicate, 2 parts by weight of polyethylene glycol [PEG in Table III-3], 20 parts by weight of sodium carbonate and 13 parts by weight of water, to prepare a detergent composition.

(2) Evaluation of Detergency of Detergent Composition:

The detergent composition obtained in (1) was tested for detergency. The artificial soiling composition used in the test was comprised of the following components:

| Organic Soiling Matter | 69.7 wt.pts. |
|---|---|
| Burnt Clay | 29.8 wt.pts. |
| Carbon Black | 0.5 wt.pts. |

The organic soiling matter was comprised of the following substances in the ratio as below:

| Oleic Acid | 28.3 wt.pts. |
|---|---|
| Triolein | 15.6 wt.pts. |
| Cholesterol-olein | 12.2 wt.pts. |
| Liquid Paraffin | 2.5 wt.pts. |
| Squalene | 2.5 wt.pts. |
| Cholesterol | 1.6 wt.pts. |
| Gelatin | 7.0 wt.pts. |
| Total | 69.7 wt.pts. |

Clean fabric was soiled with this artificial soiling composition in an wet system using an aqueous solvent, and the thus-soiled fabric was cut into pieces of 5 cm×5 cm each. These pieces had a degree of reflectivity of from 38 to 43%. The surface reflectivity of each soiled piece was measured. These soiled pieces were subjected to a washing test under the condition mentioned below.

| Washing Tester: | Terg-O-Tometer, |
|---|---|
| Number of Revolutions: | 120 rpm, |
| Hardness of Water: | 90 ppm (in terms of $CaCO_3$), |
| Amount of Washing Liquid: | 900 ml, |
| Washing Temperature: | 30° C., |
| Concentration of Detergent: | 0.067%, |
| Bath Ratio: | 30 times, |
| Washing Time: | 10 minutes, |
| Rinsing Time: | Two times for 3 minutes each, |
| Drying: | Sandwiched between sheets of filter paper and dried by ironing. |

Next, the surface reflectivity of the washed test piece was measured, and the detergency of the detergent tested was obtained according to the following equation.

$$\text{Detergency (\%)} = \frac{K/S \text{ of soiled fabric} - K/S \text{ of washed fabric}}{K/S \text{ of soiled fabric} - K/S \text{ of clean fabric}} \times 100$$

wherein;

$K/S = (1-R)^2/2R$ (Kubelka-Munk's equation) in which R indicates the surface reflectivity of fabric.

The detergency of the detergent composition of (1) tested in the manner as above was 67%.

The detergent composition and its detergency are given Table III-3.

EXAMPLES III-7 to III-10

(1) Preparation of Detergent Composition:

The polymers obtained in Example III-2 (1) to Example III-5 (1) were separately dissolved in water, and adjusted to have a pH of 10 with sodium hydroxide added thereto. These were used as a builder. Briefly, the polymer obtained in Example III-2 was used as the builder in Example III-7; that obtained in Example III-3 was as the builder in Example III-8; that obtained in Example III-4 was as the builder in Example III-9; and that obtained in Example III-5 was as the builder in Example III-10.

Various additives such as surfactants and others shown in Table III-3 were added to the builder, and formulated into detergent compositions.

(2) Evaluation of Detergency of Detergent Composition:

Each detergent composition obtained in (1) was tested for detergency in the same manner as in Example III-6 (2).

The data obtained are given in Table III-3.

COMPARATIVE EXAMPLES III-2 and III-3

(1) Preparation of Detergent Composition:

A conventional builder, A-type zeolite was used. Various additives such as surfactants and others shown in Table III-2 were added to this, and formulated into two detergent compositions.

(2) Evaluation of Detergency of Detergent Composition:

Each detergent composition obtained in (1) was tested for detergency in the same manner as in Example III-6 (2).

The data obtained are given in Table III-3.

TABLE III-3

| Example (Comparative Example) | 6 | 7 | 8 | 9 | 10 | (2) | (3) |
|---|---|---|---|---|---|---|---|
| Components of Detergent Composition (wt. %) | | | | | | | |
| Builder | 20 | 20 | 20 | 20 | 20 | — | — |
| LAS | 25 | 20 | 25 | 20 | 25 | 25 | 20 |
| AS | 10 | 10 | 10 | 10 | 10 | 10 | 10 |
| Nonionic Surfactant | — | 5 | — | 5 | — | — | 5 |
| A-type Zeolite | — | — | — | — | — | 20 | 20 |
| Sodium Silicate | 10 | 10 | 10 | 10 | 10 | 10 | 10 |
| PEG | 2 | 2 | 2 | 2 | 2 | 2 | 2 |
| Sodium Carbonate | 20 | 15 | 20 | 15 | 20 | 20 | 15 |
| Sodium Sulfate | — | 5 | — | 5 | — | — | 5 |
| Water | balance | balance | balance | balance | balance | balance | balance |
| Detergency (%) | 67 | 65 | 64 | 66 | 62 | 50 | 52 |

EXAMPLES III-11 to III-15

(1) Preparation of Dispersion:

Each polymer obtained in Example III-1 (1) to Example III-5 (1) was dissolved in water to prepare an aqueous solution having a polymer concentration of 10 ppm. To this was added activated clay to prepare an aqueous dispersion having a clay concentration of 1% by weight.

(2) Evaluation of Dispersibility:

100 ml of the dispersion was stirred for 10 minutes, and put into a 100 ml mess-cylinder. This was kept static for 14 hours. Next, 5 ml of the supernatant was sampled out, and its absorbance at 400 nm was measured. This indicates the ability of the polymer to assist clay dispersion.

The absorbance of the polymer only was 0.100; and the absorbance of the blank was 0.000.

The data of the polymer to assist clay dispersion are given in Table III-4.

TABLE III-4

| Example | Polymer Used | Absorbance |
|---|---|---|
| Example 11 | Polymer of Example 1 | 0.145 |
| Example 12 | Polymer of Example 2 | 0.150 |
| Example 13 | Polymer of Example 3 | 0.148 |
| Example 14 | Polymer of Example 4 | 0.142 |
| Example 15 | Polymer of Example 5 | 0.144 |
| Blank | | 0.000 |

Forth Aspect of the Invention

In this section, the fourth aspect of the invention will be simply referred to as "the invention".

The unsaturated carboxylic acid polymer of the invention comprises (A) repetitive units (a) of formula [IV-1], (B) repetitive units (b) of formula [IV-2], and (C) repetitive units (c) of formula [IV-3], with the structural units of the repetitive units (c) accounting for from 0.25 to 50 mol % of all the structural units of the polymer, and has a number-average molecular weight of from 500 to 1,000,000. In formula [IV-2], the alkali metal for X includes lithium, sodium, potassium, rubidium and cesium, but is preferably sodium or potassium.

For the structural units (A) constituting the unsaturated carboxylic acid polymer, the content of the repetitive units (a) of formula [IV-1] in the polymer may fall between 15 and 49.75 mol %, but preferably between 16 and 49.5 mol %. For the structural units (B) constituting the polymer, the content of the repetitive units (b) of formula [IV-2] in the polymer may fall between 50 and 75 mol %, but preferably between 50 and 74.75 mol %. For the structural units (C) constituting the polymer, the content of the repetitive units (c) of formula [IV-3] in the polymer may fall between 0.25 and 50 mol %, but preferably between 0.5 and 20 mol %.

For all the structural units constituting the unsaturated carboxylic acid polymer of the invention, it is important that the content of the repetitive units (c) of formula [IV-3] falls between 0.25 and 50 mol %. If the content of the repetitive units (c) therein is smaller than 0.25 mol %, the unsaturated carboxylic acid polymer will be poorly biodegradable; but if larger than 50 mol %, the calcium ion-sequestering ability of the polymer will be poor. Accordingly, the unsaturated carboxylic acid polymer in which the content of the structural repetitive units (c) falls between 0.5 and 20 mol % is especially useful for detergent builders.

The unsaturated carboxylic acid polymer has a number-average molecular weight of from 500 to 1,000,000. If its number-average molecular weight is smaller than 500, the ability of the polymer for soil dispersion as a builder is low; but if larger than 1,000,000, the polymer will flocculate or deposit and will therefore fail to exhibit its ability intrinsic to builders.

To produce the unsaturated carboxylic acid polymer, one or more of unsaturated carboxylic acids and their salts of formula [IV-4] may be copolymerized with an unsaturated compound of formula [IV-5] in the presence of a polymerization initiator.

Preferred examples of the starting unsaturated carboxylic acid of formula [IV-4] are acrylic acid, methacrylic acid, maleic acid, fumaric acid, etc. Preferred examples of salts of such unsaturated carboxylic acids are sodium salts, potassium salts and ammonium salts of the acids. In case where one alone of the unsaturated carboxylic acids and their salts is used herein, preferred is acrylic acid, methacrylic acid or its salt. In case where two or more of the acids and salts are combined for use herein, preferred is a combination of any two or more of acrylic acid, methacrylic acid and their salts, or a combination of any two or more of maleic acid, fumaric acid and their salts. In addition to the unsaturated carboxylic acids and their salts, comonomers may be added to the polymerization system. The comonomers include, for example, acrolein, vinyl acetate, acrylates, such as methyl acrylate, ethyl acrylate; and half esters of maleic acid such as monomethyl maleate, monoethyl maleate, etc. In case where the comonomers are added to the polymerization system, it is desirable that their amount is at most 30% by weight of the overall amount of the starting monomers. If the comonomer amount is over 30% by weight of the overall amount of the starting monomers, the copolymers produced will not be soluble in water. The unsaturated carboxylic acids to be used herein may be in the form of their anhydrides.

Specific examples of the unsaturated compound of formula [IV-5] are 4-(p-hydroxybenzanilido)-2-butenoic acid, 4-(o-hydroxybenzanilido)-2-butenoic acid, hydroxybenzanilido)-2-butenoic acid, 4-(p-aminobenzanilido)-2-butenoic acid, 4-(o-aminobenzanilido)-2-butenoic acid, 4-(m-aminobenzanilido)-2-butenoic acid, etc.

The polymerization initiator to be used in the reaction of one or more of unsaturated carboxylic acids and their salts of formula [IV-4] with an unsaturated compound of formula [IV-5] includes, for example, a combination of hydrogen peroxide and a reducing agent, as well as percarboxylic acids, permaleic acids, etc. For the reducing agent, preferred are iron ions, copper ions, zinc ions, nickel ions, ascorbic acid, saccharin, etc. The amount of the polymerization initiator to be used may fall between 0.1 and 30% by weight, but preferably between 0.5 and 20% by weight of the overall amount of the starting monomers.

As the polymerization initiator, also employable are azobisisobutyronitrile, azobis-2,4-dimethylvaleronitrile, azobiscyclohexanecarbonitrile, tetramethylthiuram disulfide, etc. The amount of the azo-type polymerization initiator to be used may fall between 0.1 and 15% by weight, but preferably between 0.5 and 10% by weight of the overall amount of the starting monomers. If the amount of the polymerization initiator used is smaller than the defined range, the amount of the non-reacted monomers will increase; but if larger than the defined range, the polymers produced could not have a sufficiently high molecular weight.

In producing the unsaturated carboxylic acid polymer, in general, no solvent is used, or an aqueous solvent is used. As the case may be, a non-aqueous solvent may be used. For the details of the non-aqueous solvent, referred to are the same as those mentioned in the section of the second aspect of the invention. To produce the polymer, the monomers are polymerized preferably in the presence of no solvent. However, in case where they are polymerized in a non-aqueous solvent, acetone is preferred for the solvent.

Regarding the reaction condition in producing the polymer, the pressure may fall generally between normal pressure and 1 MPa, but preferably between normal pressure and 0.5 MPa; the temperature may fall generally between 30 and 150° C., but preferably between 50 and 120° C. The polymerization time varies, depending on the type of the starting monomers and on the polymerization temperature, but may fall generally between 10 minutes and 20 hours, preferably between 1 and 8 hours.

The unsaturated carboxylic acid polymer of the invention thus obtained in the manner as above serves as a detergent builder. When combined with a surfactant, it forms biodegradable detergent composition. The surfactant usable herein may be any of anionic surfactants, cationic surfactants, nonionic surfactants, ampholytic surfactants, etc. In the detergent composition, the blend ratio of the builder and the surfactant is preferably such that the two each account for from 10 to 40% by weight of the overall weight of the detergent composition. Preferably, the detergent composition contains any of enzyme, bleaching agents, inorganic builders (e.g., zeolite, sodium carbonate) for the balance accounting for from 20 to 80% by weight.

For the details of the anionic surfactants, the cationic surfactants, the nonionic surfactants and the ampholytic surfactants usable herein, referred to are the same as those mentioned in the section of the second aspect of the invention.

The unsaturated carboxylic acid polymer of the invention may be neutralized with an alkali in an ordinary manner, for example, with an aqueous solution of sodium hydroxide or potassium hydroxide to give a dispersant for inorganic pigments such as calcium carbonate, clay, etc. For example, for preparing a paper coating agent that comprises an inorganic pigment such as calcium carbonate, clay or the like along with the dispersant, from 0.05 to 2.0 parts by weight of the dispersant may be added to 100 parts by weight of such an inorganic pigment, and the resulting mixture may be dispersed in water. Containing the dispersant, the paper coating agent has the advantages of low viscosity and high fluidity. In preparing the coating agent, the dispersant may be used alone, or may be combined with any other additives such as polyvinyl alcohol, etc.

As having good calcium ion-sequestering ability, the unsaturated carboxylic acid polymer of the invention is also usable as a scale inhibitor in various devices of coolant systems, water pipe lines in boilers, etc.

The invention is described in more detail with reference to the following Examples.

EXAMPLE IV-11

(1) Production of Unsaturated Carboxylic Acid Polymer:

6.9 g of maleic anhydride was put into a 100 ml separable flask equipped with a stirrer and a thermocouple, to which was added an aqueous solution of 6.8 g of sodium hydroxide in 11.4 g of water. Next, 7.2 g of acrylic acid, then 6.18 g of 4-(p-hydroxybenzanilido)-2-butenoic acid, and 10 mg, in terms of $FeCl_2$, of ferrous chloride tetrahydrate serving as a reducing agent were added thereto in that order, and heated at 100° C.

Next, 5.6 g of aqueous 60 wt. % hydrogen peroxide was dropwise added to the resulting solution with stirring over a period of 4 hours. After the addition, this was kept stirred for 1 hour at 100° C., at which the monomers were reacted.

The resulting reaction product was lyophilized, and the solid polymer thus obtained weighed 21.5 g (yield: 85.6%).

The number-average molecular weight of the polymer thus obtained was measured in gel permeation chromatography (GPC) based on a standard substance, polyacrylic acid, and was 2,040. The weight-average molecular weight of the polymer was 31,380.

Figure 7:
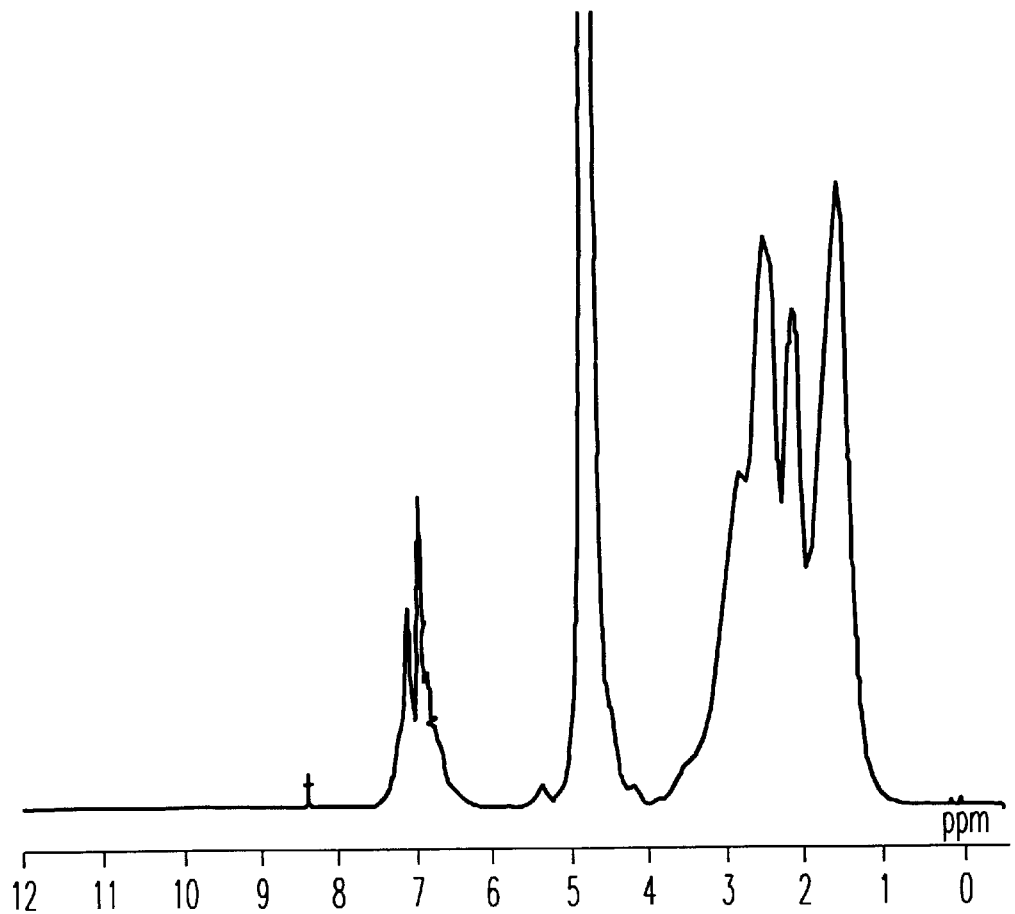
FIGS. 7–9 are the ¹H-NMR spectral charts of the unsaturated carboxylic acid polymers obtained in Example IV-1 to Example IV-3, respectively.

The polymer was analyzed by the use of an NMR device at 270 MHz. In its $^1$H-NMR chart, seen were an absorption peak based on the main chain of the polymer, in a range of from 1.2 to 3.0 ppm; and a p-aminophenol skeleton-derived absorption peak in a range of from 6.2 to 7.7 ppm. These absorption peaks confirm that the content of the p-aminophenol skeleton-containing structural units in the polymer obtained herein is 6.3 mol %. The $^1$H-NMR chart of the polymer is in FIG. 7. For analyzing it herein, the polymer was purified through reprecipitation, and used as the sample.

The data (including yield, etc.) of the unsaturated carboxylic acid obtained herein are given in Table IV-1.

(2) Evaluation of Calcium Ion-sequestering Ability:

20 mg of the polymer obtained in (1) was put into a 200 ml beaker, to which was added 100 g of an aqueous solution containing 0.1 N calcium chloride, 0.1 N potassium chloride and 0.4 N ammonia and having a calcium ion concentration of 40 ppm, and the polymer was dissolved in the aqueous solution.

Next, the divalent calcium ion concentration in the resulting solution was measured, using a calcium ion electrode. The amount of calcium carbonate (mg) as trapped by 1 g of the polymer was obtained, which indicates the calcium ion-sequestering ability of the polymer. Thus measured, the calcium ion-sequestering ability of the polymer obtained in (1) was 235 mg/g.

(3) Evaluation of Biodegradability:

The polymer obtained in (1) was tested for biodegradability according to JIS K6950. The biodegradability was obtained from TOC (total organic carbon) of the polymer. As a result, the biodegradability of the polymer obtained in (1) was 83%.

The data in (2) and (3) are all given in Table IV-1. In the Table, "Example IV-1" is simply referred to as "Example 1", and the same shall apply to Comparative Examples. The same simplified expression shall apply hereinunder.

EXAMPLE IV-2

Figure 8:
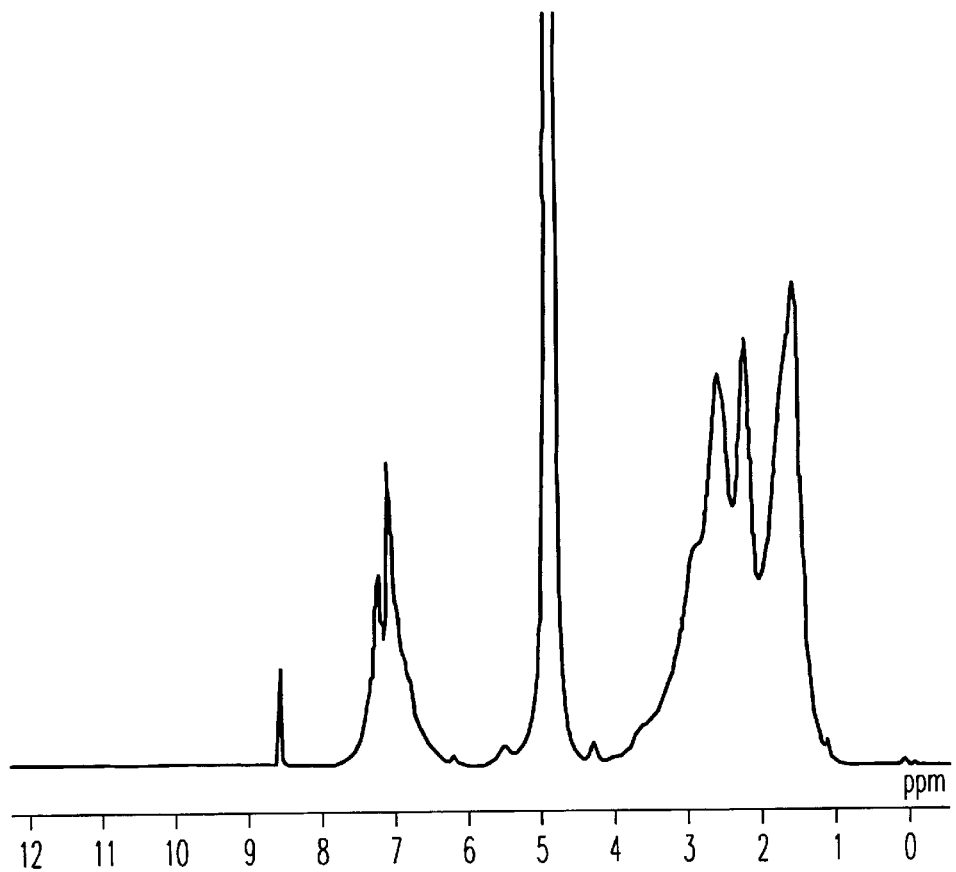

(1) Production of Unsaturated Carboxylic Acid Polymer:

In the same manner as in Example IV-1, obtained was an unsaturated carboxylic acid polymer, for which, however, the amount of maleic anhydride used was 4.9 g, that of sodium hydroxide used was 6.0 g, and that of 4-(p-hydroxybenzanilido)-2-butenoic acid used was 10.3 g. The content of the p-aminophenol skeleton-containing structural units in the polymer obtained herein was 10.4 mol %. The $^1$H-NMR chart of the polymer is in FIG. 8.

The data (including yield, etc.) of the unsaturated carboxylic acid obtained herein are given in Table IV-1.

(2) Evaluation of Calcium Ion-sequestering Ability:

The calcium ion-sequestering ability of the polymer obtained in (1) was measured in the same manner as in Example IV-1 (2).

(3) Evaluation of Biodegradability:

The biodegradability of the polymer obtained in (1) was measured in the same manner as in Example IV-1 (3).

The data in (2) and (3) are given in Table IV-1.

EXAMPLE IV-3

Figure 9:
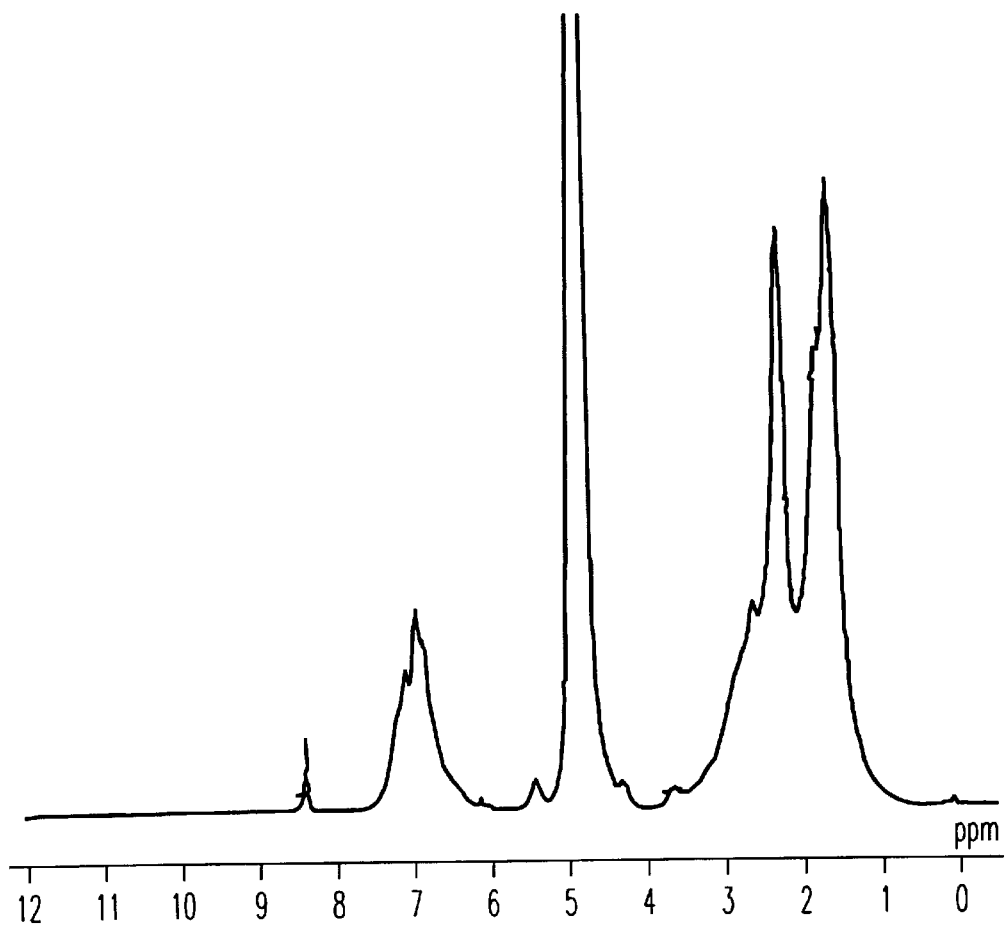

(1) Production of Unsaturated Carboxylic Acid Polymer:

In the same manner as in Example IV-1, obtained was an unsaturated carboxylic acid polymer, for which, however, maleic anhydride was not used, the amount of sodium hydroxide used was 6.0 g, and that of 4-(p-hydroxybenzanilido)-2-butenoic acid used was 20.6 g. The content of the p-aminophenol skeleton-containing structural units in the polymer obtained herein was 11.3 mol %. The $^1$H-NMR chart of the polymer is in FIG. 9.

The data (including yield, etc.) of the unsaturated carboxylic acid polymer obtained herein are given in Table IV-1.

(2) Evaluation of Calcium Ion-sequestering Ability:

The calcium ion-sequestering ability of the polymer obtained in (1) was measured in the same manner as in Example IV-1 (2).

(3) Evaluation of Biodegradability:

The biodegradability of the polymer obtained in (1) was measured in the same manner as in Example IV-1 (3).

The data in (2) and (3) are given in Table IV-1.

TABLE IV-1

| Example | Yield (g) | Yield (%) | Number-average Molecular Weight | Weight-average Molecular Weight | $Ca^{2+}$-sequestering Ability (mg/g) | Biodegradability (%) |
|---|---|---|---|---|---|---|
| Example 1 | 21.5 | 85.6 | 2,040 | 31,380 | 235 | 70 |
| Example 2 | 20.7 | 75.2 | 1,770 | 32,130 | 195 | 75 |
| Example 3 | 14.3 | 47.7 | 2,850 | 74,593 | 180 | 82 |

EXAMPLE IV-4

(1) Preparation of Detergent Composition:

The polymer obtained in Example IV-1 (1) was dissolved in water, and adjusted to have a pH of 10 with sodium hydroxide added thereto. This was used as a builder.

To 20 parts by weight of the builder, added were 25 parts by weight of sodium linear alkylbenzenesulfonate [LAS in Table IV-5] and 10 parts by weight of sodium alkylsulfate [AS in Table IV-5] both serving as a surfactant, and other additives, 10 parts by weight of sodium silicate, 2 parts by weight of polyethylene glycol [PEG in Table IV-5], 20 parts by weight of sodium carbonate and 13 parts by weight of water, to prepare a detergent composition.

(2) Evaluation of Detergency of Detergent Composition:

The detergent composition obtained in (1) was tested for detergency. The artificial soiling composition used in the test was comprised of the components mentioned below.

TABLE IV-2

| Component | Amount (wt.pts.) |
|---|---|
| Organic Soiling Matter | 69.7 |
| Burnt Clay | 29.8 |
| Carbon Black | 0.5 |

The organic soiling matter was comprised of the following substances in the ratio as below.

TABLE IV-3

| Constituent Substance | Amount (wt.pts.) |
|---|---|
| Oleic Acid | 28.3 |
| Triolein | 15.6 |
| Cholesterol-olein | 12.2 |
| Liquid Paraffin | 2.5 |
| Squalene | 2.5 |
| Cholesterol | 1.6 |
| Gelatin | 7.0 |
| Total | 69.7 |

Clean fabric was soiled with this artificial soiling composition in an wet system using an aqueous solvent, and the thus-soiled fabric was cut into pieces of 5 cm×5 cm each. These pieces had a degree of reflectivity of from 38 to 43%. The surface reflectivity of each soiled piece was measured. These soiled pieces were subjected to a washing test under the condition mentioned below.

TABLE IV-4

| Item | Condition |
|---|---|
| Washing Tester | Terg-O-Tometer |
| Number of Revolutions | 120 rpm |
| Hardness of Water | 90 ppm (in terms of $CaCO_3$) |
| Amount of Washing Liquid | 900 ml |
| Washing Temperature | 30° C. |
| Concentration of Detergent | 0.067% |
| Bath Ratio | 30 times |
| Washing Time | 10 minutes |
| Rinsing Time | Two times for 3 minutes each |
| Drying | Sandwiched between sheets of filter paper and dried by ironing. |

Next, the surface reflectivity of the washed test piece was measured, and the detergency of the detergent tested was obtained according to the following equation.

$$\text{Detergency (\%)} = \frac{K/S \text{ of soiled fabric} - K/S \text{ of washed fabric}}{K/S \text{ of soiled fabric} - K/S \text{ of clean fabric}} \times 100$$

wherein;

$K/S=(1-R)^2/2R$ (Kubelka-Munk's equation) in which R indicates the surface reflectivity of fabric.

The detergency of the detergent composition of (1) tested in the manner as above was 67%.

The detergent composition and its detergency are given Table IV-5.

EXAMPLES IV-5
(1) Preparation of Detergent Composition:

In the same manner as in Example IV-4, obtained was a detergent composition, for which, however, the polymer obtained in Example IV-2 (1) was used as the builder.

(2) Evaluation of Detergency of Detergent Composition:

The detergent composition obtained in (1) was tested for detergency, in the same manner as in Example IV-4 (2).

The data are given in Table IV-5.

EXAMPLES IV-6
(1) Preparation of Detergent Composition:

In the same manner as in Example IV-4, obtained was a detergent composition, for which, however, the polymer obtained in Example IV-3 (1) was used as the builder.

(2) Evaluation of Detergency of Detergent Composition:

The detergent composition obtained in (1) was tested for detergency, in the same manner as in Example IV-4 (2).

The data are given in Table IV-5.

TABLE IV-5

| | Example | Example 1 | Example 2 | Example 3 |
|---|---|---|---|---|
| Components of Detergent Composition (wt. %) | Builder | 20 | 20 | 20 |
| | LAS | 20 | 20 | 25 |
| | AS | 10 | 10 | 10 |
| | Nonionic Surfactant | — | 5 | — |
| | Sodium Silicate | 10 | 10 | 10 |
| | PEG | 2 | 2 | 2 |
| | Sodium Carbonate | 20 | 15 | 20 |
| | Sodium Sulfate | — | 5 | — |
| | Water | balance | balance | balance |
| | Detergency (%) | 61 | 62 | 64 |

EXAMPLE IV-7
(1) Preparation of Dispersion:

The polymer obtained in Example IV-1 (1) was dissolved in water to prepare an aqueous solution having a polymer concentration of 10 ppm. To this was added activated clay to prepare an aqueous dispersion having a clay concentration of 1% by weight.

(2) Evaluation of Dispersibility:

100 ml of the dispersion was stirred for 10 minutes, and put into a 100 ml mess-cylinder. This was kept static for 14 hours. Next, 5 ml of the supernatant was sampled out, and its absorbance at 400 nm was measured. This indicates the ability of the polymer to assist clay dispersion.

The absorbance of the polymer only was 0.100; and the absorbance of the blank was 0.000.

The data of the polymer to assist clay dispersion are given in Table IV-6.

EXAMPLE IV-8
(1) Preparation of Dispersion:

A dispersion was prepared in the same manner as in Example IV-7 (1). For this, however, used was the polymer obtained in Example IV-2 (1).

(2) Evaluation of Dispersibility:

The dispersibility of the dispersion prepared in (1) was evaluated in the same manner as in Example IV-7 (2). The data obtained are given in Table IV-6.

EXAMPLE IV-9
(1) Preparation of Dispersion:

A dispersion was prepared in the same manner as in Example IV-7 (1). For this, however, used was the polymer obtained in Example IV-3 (1).

(2) Evaluation of Dispersibility:

The dispersibility of the dispersion prepared in (1) was evaluated in the same manner as in Example IV-7 (2). The data obtained are given in Table IV-6.

TABLE IV-6

| Example | Polymer Used | Absorbance |
|---|---|---|
| Example 7 | Polymer of Example 1 | 0.125 |
| Example 8 | Polymer of Example 2 | 0.115 |
| Example 9 | Polymer of Example 3 | 0.140 |

INDUSTRIAL APPLICABILITY

The crosslinked, carboxylic acid-based copolymer of the invention absorbs water and is biodegradable. Therefore, it is a good absorbent resin. The unsaturated carboxylic acid polymer of the invention has good calcium ion-sequestering ability and is well biodegradable. Therefore, it is highly useful as a detergent builder. A detergent composition comprising the unsaturated carboxylic acid polymer and a surfactant has the advantages of good detergency and good biodegradability. A dispersant comprising the unsaturated carboxylic acid polymer has the advantages of good dispersibility and good biodegradability.

What is claimed is:

1. A product of an unsaturated carboxylic acid-based copolymer comprising polymerized units of an unsaturated monocarboxylic acid monomer and a quinone, and wherein the copolymer comprises from 1 to 10 mol % of the quinone, wherein the product is crosslinked.

2. The crosslinked product of an unsaturated carboxylic acid-based copolymer as claimed in claim 1, comprising polymerized units of at least one of acrylic acid, methacrylic acid, or salts thereof.

3. The crosslinked product of an unsaturated carboxylic acid-based copolymer as claimed in claim 1, wherein the quinone is at least one selected from the group consisting of hydroquinone, resorcinol, catechol, naphthalenediol, anthraquinol, benzoquinone, naphthoquinone, anthraquinone, and substituted derivatives thereof.

4. The crosslinked product of an unsaturated carboxylic acid-based copolymer as claimed in claim 1, which is a biodegradable absorbent resin.

5. A method for producing the crosslinked product of an unsaturated carboxylic acid-based copolymer of claim 1, which comprises heating an unsaturated monocarboxylic acid monomer, a quinone and a crosslinking agent in an aqueous solvent in the presence of an initiator, wherein the quinone accounts for from 1 to 10 mol % of the overall amount of the monomer components.

6. The method as claimed in claim 5, wherein the crosslinking agent is a water-soluble compound having, in one molecule, at least two hydroxyl groups, amino groups or unsaturated groups capable of reacting with a carboxyl group.

7. An unsaturated carboxylic acid polymer, which comprises polymerized units of;

(A) from 30 to 99 mol % of repetitive units (a) of formula [III-1]:

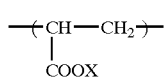  [III-1]

wherein X represents a hydrogen atom, an alkali metal atom or an ammonium group, (B) from 0 to 69.9 mol % of repetitive units (b) of formula [III-2]:

  [III-2]

wherein X represents a hydrogen atom, an alkali metal atom or an ammonium group, and (C) from 0.1 to 50 mol % of repetitive units selected from the group consisting of: (c) of formula [III-3]:

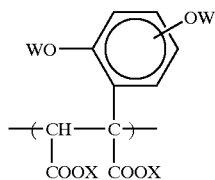  [III-3]

wherein X represents a hydrogen atom, an alkali metal atom or an ammonium group, and W represents a hydrogen atom or an alkali metal atom, repetitive units (d) of formula [III-4]:

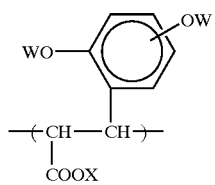  [III-4]

wherein X represents a hydrogen atom, an alkali metal atom or an ammonium group, and W represents a hydrogen atom or an alkali metal atom, and repetitive units (e) of formula [III-5]:

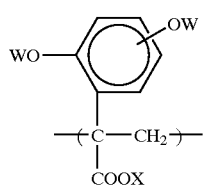  [III-5]

wherein X represents a hydrogen atom, an alkali metal atom or an ammonium group, and W represents a hydrogen atom or an alkali metal atom, and wherein the polymer has a number-average molecular weight of from 500 to 1,000,000.

8. An unsaturated carboxylic acid polymer, which comprises polymerized units of;

(A) from 30 to 99 mol % of repetitive units (a) of formula [III-1]:

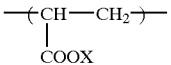  [III-1]

wherein X represents a hydrogen atom, an alkali metal atom or an ammonium group, (B) from 0 to 69.9 mol % of repetitive units (b) of formula [III-2]:

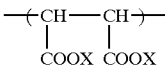  [III-2]

wherein X represents a hydrogen atom, an alkali metal atom or an ammonium group, and (C) from 0.1 to 50 mol % of repetitive units selected from the group consisting of (c') of formula [III-3']:

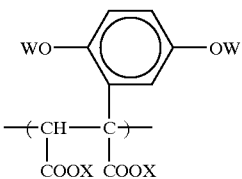  [III-3']

wherein X represents a hydrogen atom, an alkali metal atom or an ammonium group, and W represents a hydrogen atom or an alkali metal atom, repetitive units (d') of formula [III-4']:

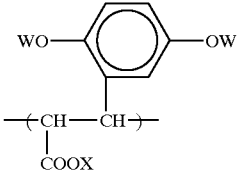  [III-4']

wherein X represents a hydrogen atom, an alkali metal atom or an ammonium group, and W represents a hydrogen atom or an alkali metal atom, and repetitive units (e') of formula [III-5']:

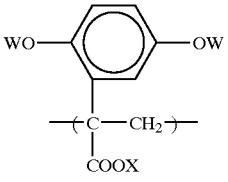  [III-5']

wherein X represents a hydrogen atom, an alkali metal atom or an ammonium group, and W represents a hydrogen atom or an alkali metal atom, and wherein the polymer has a number-average molecular weight of from 500 to 1,000,000.

9. A biodegradable builder comprising the unsaturated carboxylic acid polymer of claim 7.

10. A detergent composition comprising the unsaturated carboxylic acid polymer of claim 7, and a surfactant.

11. A dispersant which comprises a polymer prepared by neutralizing the unsaturated carboxylic acid polymer of claim 7 with an alkali.

12. An unsaturated carboxylic acid polymer, which comprises;

(A) repetitive units (a) of formula [IV-1]:

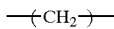
    [IV-1], (B) repetitive units (b) of formula [IV-2]:

    [IV-2]

wherein $R^1$ represents a hydrogen atom or a methyl group; X represents a hydrogen atom, an alkali metal atom or an ammonium group, and (C) repetitive units (c) of formula [IV-3]:

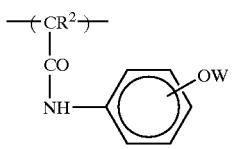
    [IV-3]

wherein $R^2$ represents a hydrogen atom or a methyl group; W represents a hydrogen atom or an alkali metal atom,
  wherein the repetitive units (c) account for from 0.25 to 50 mol % of all the repetitive units of the polymer, and
  wherein the polymer has a number-average molecular weight of from 500 to 1,000,000.

13. An unsaturated carboxylic acid polymer, which comprises;

(A) repetitive units (a) of a formula [IV-1]:

    [IV-1], (B) repetitive units (b) of formula [IV-2]:

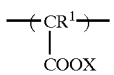
    [IV-2]

wherein $R^1$ represents a hydrogen atom or a methyl group; X represents a hydrogen atom, an alkali metal atom or an ammonium group, and (C) repetitive units (c') of formula [IV-3']:

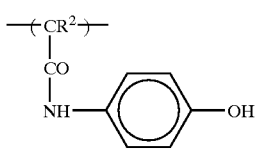
    [IV-3']

wherein $R^2$ represents a hydrogen atom or a methyl group,
  wherein the repetitive units (c') account for from 0.25 to 50 mol % of all the repetitive units of the polymer, and
  wherein the polymer has a number-average molecular weight of from 500 to 1,000,000.

14. A method for producing the unsaturated carboxylic acid polymer of claim 12, which comprises
  copolymerizing one or more unsaturated carboxylic acids or salts thereof of formula [IV-4]:

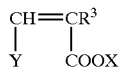
    [IV-4]

wherein $R^3$ represents a hydrogen atom or a methyl group; X represents a hydrogen atom, an alkali metal atom or an ammonium group; and Y represents a hydrogen atom or a group of COOX,
  with an unsaturated compound of formula [IV-5]:

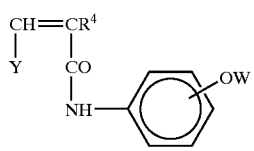
    [IV-5]

wherein $R^4$ represents a hydrogen atom or a methyl group; Y represents a hydrogen atom or a group of COOX; X represents a hydrogen atom, an alkali metal atom or an ammonium group; and W represents a hydrogen atom or an alkali metal atom,
  in the presence of a polymerization initiator.

15. A method for producing the unsaturated carboxylic acid polymer of claim 13, which comprises
  copolymerizing one or more of unsaturated carboxylic acids or salts thereof of formula [IV-4]:

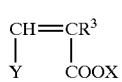
    [IV-4]

wherein $R^3$ represents a hydrogen atom or a methyl group; X represents a hydrogen atom, an alkali metal atom or an ammonium group; and Y represents a hydrogen atom or a group of COOX,
  with an unsaturated compound of formula [IV-5']:

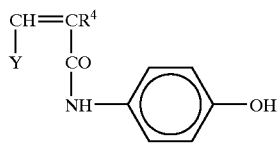
    [IV-5']

wherein $R^4$ represents a hydrogen atom or a methyl group; Y represents a hydrogen atom or a group of COOX; X represents a hydrogen atom, an alkali metal atom or an ammonium group,
  in the presence of a polymerization initiator.

16. A biodegradable builder comprising the unsaturated carboxylic acid polymer of claim 12.

17. A detergent composition comprising the unsaturated carboxylic acid polymer of claim 12 and a surfactant.

18. A dispersant which comprises a polymer prepared by neutralizing the unsaturated carboxylic acid polymer of claim 12 with an alkali.

19. A biodegradable builder comprising the unsaturated carboxylic acid polymer of claim 8.

20. A detergent composition comprising the unsaturated carboxylic acid polymer of claim 8 and a surfactant.

21. A dispersant which comprises a polymer prepared by neutralizing the unsaturated carboxylic acid polymer of claim 8 with an alkali.

22. A biodegradable builder comprising the unsaturated carboxylic acid polymer of claim 13.

23. A detergent composition comprising the unsaturated carboxylic acid polymer of claim 13 and a surfactant.

24. A dispersant which comprises a polymer prepared by neutralizing the unsaturated carboxylic acid polymer of claim 13 with an alkali.

* * * * *

UNITED STATES PATENT AND TRADEMARK OFFICE
CERTIFICATE OF CORRECTION

PATENT NO. : 6,699,830 B1
DATED : March 2, 2004
INVENTOR(S) : Matsuo et al.

It is certified that error appears in the above-identified patent and that said Letters Patent is hereby corrected as shown below:

Title page, Item [54] and Column 1, Lines 1-7,
Title, should read:
-- [54] CROSSLINKED COPOLYMER OF UNSATURATED CARBOXYLIC ACID AND PROCESS FOR PRODUCING THE SAME, COPOLYMER OF UNSATURATED CARBOXYLIC ACID, BIODEGRADABLE BUILDER, AND DETERGENT COMPOSITION --

Signed and Sealed this

Eighteenth Day of May, 2004

JON W. DUDAS
*Acting Director of the United States Patent and Trademark Office*